(12) United States Patent
Taylor et al.

(10) Patent No.: US 11,998,886 B2
(45) Date of Patent: Jun. 4, 2024

(54) REGENERATIVE COOLING METHOD AND APPARATUS

(71) Applicant: Monolith Materials, Inc., Lincoln, NE (US)

(72) Inventors: Roscoe W. Taylor, Kingwood, TX (US); Alexander F. Hoermann, Menlo Park, CA (US)

(73) Assignee: Monolith Materials, Inc., Lincoln, NE (US)

( * ) Notice: Subject to any disclaimer, the term of this patent is extended or adjusted under 35 U.S.C. 154(b) by 0 days.

(21) Appl. No.: 17/565,864

(22) Filed: Dec. 30, 2021

(65) Prior Publication Data

US 2022/0339595 A1  Oct. 27, 2022

Related U.S. Application Data

(63) Continuation of application No. 17/329,532, filed on May 25, 2021, now abandoned, which is a
(Continued)

(51) Int. Cl.
*B01J 19/08* (2006.01)
*B01J 19/00* (2006.01)
(Continued)

(52) U.S. Cl.
CPC ......... *B01J 19/087* (2013.01); *B01J 19/0013* (2013.01); *C09C 1/485* (2013.01);
(Continued)

(58) Field of Classification Search
CPC .................. B01J 19/087; B01J 19/0013; B01J 2219/0803; B01J 2219/0871;
(Continued)

(56) References Cited

U.S. PATENT DOCUMENTS

| 709,868 A | 9/1902 | Bradley et al. |
| 1,339,225 A | 5/1920 | Rose |

(Continued)

FOREIGN PATENT DOCUMENTS

| AU | 2897071 A | 11/1972 |
| BG | 98848 A | 5/1995 |

(Continued)

OTHER PUBLICATIONS

AP-42, Fifth Edition, vol. 1, Chapter 6: Organic Chemical Process Industry, Section 6.1: Carbon Black (1983): 1-10.
(Continued)

*Primary Examiner* — Xiuyu Tai
(74) *Attorney, Agent, or Firm* — Wilson Sonsini Goodrich & Rosati

(57) ABSTRACT

A method of cooling a liner in a plasma chamber. A recycle gas is contacted with or passed through the liner to cool the liner and pre-heat the recycle gas. The pre-heated gas is then recycled through the plasma chamber to become part of the plasma forming process. The method further comprises the liner is graphite, the recycle gas passes through at least one cooling channel present in the liner, at least one of the cooling channels are covered with at least one removable liner/channel cover, carbon deposits are formed from the presence of hydrocarbons in the recycle gas, at least one channel is formed in a spiral cooling channel pattern, at least one channel is formed in a substantially straight cooling channel pattern, and a plenum to aid in the production of an even distribution of cooling gas in the channels.

20 Claims, 7 Drawing Sheets

Related U.S. Application Data continuation of application No. 17/072,416, filed on Oct. 16, 2020, now abandoned, which is a continuation of application No. 16/807,550, filed on Mar. 3, 2020, now abandoned, which is a continuation of application No. 15/548,348, filed as application No. PCT/US2016/015942 on Feb. 1, 2016, now Pat. No. 10,618,026.

(60) Provisional application No. 62/111,341, filed on Feb. 3, 2015.

(51) Int. Cl.
  *C09C 1/48* (2006.01)
  *F27B 3/24* (2006.01)
  *F27D 1/00* (2006.01)
  *F27D 9/00* (2006.01)
  *F27D 17/00* (2006.01)
  *F28D 21/00* (2006.01)

(52) U.S. Cl.
  CPC .............. *F27B 3/24* (2013.01); *F27D 1/0003* (2013.01); *F27D 9/00* (2013.01); *F27D 17/004* (2013.01); *F28D 21/00* (2013.01); *B01J 2219/0803* (2013.01); *B01J 2219/0871* (2013.01); *B01J 2219/0875* (2013.01); *B01J 2219/0898* (2013.01); *F27D 2009/0008* (2013.01); *F28D 2021/0022* (2013.01); *F28D 2021/0056* (2013.01); *F28D 2021/0078* (2013.01)

(58) Field of Classification Search
  CPC ........ B01J 2219/0875; B01J 2219/0898; B01J 19/0006; B01J 19/088; C09C 1/485; C09C 1/487; C09C 1/48; F27B 3/24; F27D 1/0003; F27D 9/00; F27D 17/004; F27D 2009/0008; F28D 21/00; F28D 2021/0022; F28D 2021/0056; F28D 2021/0078; H05H 1/26; H05H 1/28; C01B 3/24; C01B 32/15; C01B 32/154; B82Y 30/00; B82Y 40/00; C01P 2002/30
  See application file for complete search history.

(56) References Cited

U.S. PATENT DOCUMENTS

| | | |
|---|---|---|
| 1,536,612 A | 5/1925 | Lewis |
| 1,597,277 A | 8/1926 | Jakowsky |
| 1,931,800 A | 10/1933 | Jakosky et al. |
| 2,002,003 A | 5/1935 | Otto et al. |
| 2,039,312 A | 5/1936 | Goldman |
| 2,062,358 A | 12/1936 | Frolich |
| 2,393,106 A | 1/1946 | Bernard et al. |
| 2,557,143 A | 6/1951 | Royster |
| 2,572,851 A | 10/1951 | Daniel et al. |
| 2,603,669 A | 7/1952 | Chappell |
| 2,616,842 A | 11/1952 | Charles et al. |
| 2,785,964 A | 3/1957 | Pollock |
| 2,850,403 A | 9/1958 | Day |
| 2,851,403 A | 9/1958 | Hale |
| 2,897,071 A | 7/1959 | Gilbert |
| 2,897,869 A | 8/1959 | Polmanteer |
| 2,951,143 A | 8/1960 | Anderson et al. |
| 3,009,783 A | 11/1961 | Charles et al. |
| 3,073,769 A | 1/1963 | George et al. |
| 3,127,536 A | 3/1964 | McLane |
| 3,253,890 A | 5/1966 | De et al. |
| 3,288,696 A | 11/1966 | Orbach |
| 3,307,923 A | 3/1967 | Ruble |
| 3,308,164 A | 3/1967 | Shepard |
| 3,309,780 A | 3/1967 | Goins |
| 3,331,664 A | 7/1967 | Jordan |
| 3,342,554 A | 9/1967 | Jordan et al. |
| 3,344,051 A | 9/1967 | Latham, Jr. et al. |
| 3,408,164 A | 10/1968 | Johnson |
| 3,409,403 A | 11/1968 | Geir et al. |
| 3,420,632 A | 1/1969 | Ryan et al. |
| 3,431,074 A | 3/1969 | Jordan et al. |
| 3,453,488 A | 7/1969 | Cann et al. |
| 3,464,793 A | 9/1969 | Jordan et al. |
| 3,619,138 A | 11/1971 | Gunnell |
| 3,619,140 A | 11/1971 | Morgan et al. |
| 3,637,974 A | 1/1972 | Tajbl et al. |
| 3,673,375 A | 6/1972 | Camacho et al. |
| 3,725,103 A | 4/1973 | Jordan et al. |
| 3,852,399 A | 12/1974 | Rothbuhr et al. |
| 3,922,335 A | 11/1975 | Jordan et al. |
| 3,959,008 A | 5/1976 | Warner et al. |
| 3,981,654 A | 9/1976 | Rood et al. |
| 3,981,659 A | 9/1976 | Myers |
| 3,984,743 A | 10/1976 | Horie |
| 3,998,934 A | 12/1976 | Vanderveen |
| 4,019,896 A | 4/1977 | Appleby |
| 4,028,072 A | 6/1977 | Braun et al. |
| 4,035,336 A | 7/1977 | Jordan et al. |
| 4,057,396 A | 11/1977 | Matovich |
| 4,075,160 A | 2/1978 | Mills et al. |
| 4,088,741 A | 5/1978 | Takewell |
| 4,101,639 A | 7/1978 | Surovikin et al. |
| 4,138,471 A | 2/1979 | Lamond et al. |
| 4,199,545 A | 4/1980 | Matovich |
| 4,282,199 A | 8/1981 | Lamond et al. |
| 4,289,949 A | 9/1981 | Raaness et al. |
| 4,292,291 A | 9/1981 | Rothbuhr et al. |
| 4,317,001 A | 2/1982 | Silver et al. |
| 4,372,937 A | 2/1983 | Johnson |
| 4,404,178 A | 9/1983 | Johnson et al. |
| 4,431,624 A | 2/1984 | Casperson |
| 4,452,771 A | 6/1984 | Hunt |
| 4,460,558 A | 7/1984 | Johnson |
| 4,472,172 A | 9/1984 | Sheer et al. |
| 4,543,470 A | 9/1985 | Santen et al. |
| 4,553,981 A | 11/1985 | Fuderer |
| 4,577,461 A | 3/1986 | Cann |
| 4,597,776 A | 7/1986 | Ullman et al. |
| 4,601,887 A | 7/1986 | Dorn et al. |
| 4,678,888 A | 7/1987 | Camacho et al. |
| 4,689,199 A | 8/1987 | Eckert et al. |
| 4,755,371 A | 7/1988 | Dickerson |
| 4,765,964 A | 8/1988 | Gravley et al. |
| 4,766,287 A | 8/1988 | Morrisroe et al. |
| 4,787,320 A | 11/1988 | Raaness et al. |
| 4,864,096 A | 9/1989 | Wolf et al. |
| 4,977,305 A | 12/1990 | Severance, Jr. |
| 5,039,312 A | 8/1991 | Hollis, Jr. et al. |
| 5,045,667 A | 9/1991 | Iceland et al. |
| 5,046,145 A | 9/1991 | Drouet |
| 5,105,123 A | 4/1992 | Ballou |
| 5,138,959 A | 8/1992 | Kulkarni |
| 5,147,998 A | 9/1992 | Tsantrizos et al. |
| 5,206,880 A | 4/1993 | Olsson |
| 5,222,448 A | 6/1993 | Morgenthaler et al. |
| 5,352,289 A | 10/1994 | Weaver et al. |
| 5,399,957 A | 3/1995 | Vierboom |
| 5,427,762 A | 6/1995 | Steinberg et al. |
| 5,476,826 A | 12/1995 | Greenwald et al. |
| 5,481,080 A | 1/1996 | Lynum et al. |
| 5,486,674 A | 1/1996 | Lynum et al. |
| 5,500,501 A | 3/1996 | Lynum et al. |
| 5,527,518 A | 6/1996 | Lynum et al. |
| 5,578,647 A | 11/1996 | Li et al. |
| 5,593,644 A | 1/1997 | Norman et al. |
| 5,602,298 A | 2/1997 | Levin |
| 5,604,424 A | 2/1997 | Shuttleworth |
| 5,611,947 A | 3/1997 | Vavruska |
| 5,673,285 A | 9/1997 | Wittle et al. |
| 5,717,293 A | 2/1998 | Sellers |
| 5,725,616 A | 3/1998 | Lynum et al. |
| 5,749,937 A | 5/1998 | Detering et al. |
| 5,935,293 A | 8/1999 | Detering et al. |

(56) References Cited

U.S. PATENT DOCUMENTS

| | | |
|---|---|---|
| 5,951,960 A | 9/1999 | Lynum et al. |
| 5,989,512 A | 11/1999 | Lynum et al. |
| 5,997,837 A | 12/1999 | Lynum et al. |
| 6,042,643 A | 3/2000 | Belmont et al. |
| 6,058,133 A | 5/2000 | Bowman et al. |
| 6,068,827 A | 5/2000 | Lynum et al. |
| 6,099,696 A | 8/2000 | Schwob et al. |
| 6,188,187 B1 | 2/2001 | Harlan |
| 6,197,274 B1 | 3/2001 | Mahmud et al. |
| 6,277,350 B1 | 8/2001 | Gerspacher |
| 6,358,375 B1 | 3/2002 | Schwob |
| 6,380,507 B1 | 4/2002 | Childs |
| 6,395,197 B1 | 5/2002 | Detering et al. |
| 6,403,697 B1 | 6/2002 | Mitsunaga et al. |
| 6,441,084 B1 | 8/2002 | Lee et al. |
| 6,442,950 B1 | 9/2002 | Tung |
| 6,444,727 B1 | 9/2002 | Yamada et al. |
| 6,471,937 B1 | 10/2002 | Anderson et al. |
| 6,602,920 B2 | 8/2003 | Hall et al. |
| 6,703,580 B2 | 3/2004 | Brunet et al. |
| 6,773,689 B1 | 8/2004 | Lynum et al. |
| 6,955,707 B2 | 10/2005 | Ezell et al. |
| 7,167,240 B2 | 1/2007 | Stagg |
| 7,294,314 B2 | 11/2007 | Graham |
| 7,312,415 B2 | 12/2007 | Ohmi et al. |
| 7,360,309 B2 | 4/2008 | Vaidyanathan et al. |
| 7,431,909 B1 | 10/2008 | Rumpf et al. |
| 7,452,514 B2 | 11/2008 | Fabry et al. |
| 7,462,343 B2 | 12/2008 | Lynum et al. |
| 7,563,525 B2 | 7/2009 | Ennis |
| 7,582,184 B2 | 9/2009 | Tomita et al. |
| 7,623,340 B1 | 11/2009 | Song et al. |
| 7,635,824 B2 | 12/2009 | Miki et al. |
| 7,655,209 B2 | 2/2010 | Rumpf et al. |
| 7,777,151 B2 | 8/2010 | Kuo |
| 7,847,009 B2 | 12/2010 | Wong et al. |
| 7,931,712 B2 | 4/2011 | Zubrin et al. |
| 7,968,191 B2 | 6/2011 | Hampden-Smith et al. |
| 8,147,765 B2 | 4/2012 | Muradov et al. |
| 8,221,689 B2 | 7/2012 | Boutot et al. |
| 8,257,452 B2 | 9/2012 | Menzel |
| 8,277,739 B2 | 10/2012 | Monsen et al. |
| 8,323,793 B2 | 12/2012 | Hamby et al. |
| 8,443,741 B2 | 5/2013 | Chapman et al. |
| 8,471,170 B2 | 6/2013 | Li et al. |
| 8,486,364 B2 | 7/2013 | Vanier et al. |
| 8,501,148 B2 | 8/2013 | Belmont et al. |
| 8,581,147 B2 | 11/2013 | Kooken et al. |
| 8,710,136 B2 | 4/2014 | Yurovskaya et al. |
| 8,771,386 B2 | 7/2014 | Licht et al. |
| 8,784,617 B2 | 7/2014 | Novoselov et al. |
| 8,850,826 B2 | 10/2014 | Ennis |
| 8,871,173 B2 | 10/2014 | Nester et al. |
| 8,911,596 B2 | 12/2014 | Vancina |
| 8,945,434 B2 | 2/2015 | Krause et al. |
| 9,095,835 B2 | 8/2015 | Skoptsov et al. |
| 9,229,396 B1 | 1/2016 | Wu et al. |
| 9,315,735 B2 | 4/2016 | Cole et al. |
| 9,388,300 B2 | 7/2016 | Dikan et al. |
| 9,445,488 B2 | 9/2016 | Foret |
| 9,574,086 B2 | 2/2017 | Johnson et al. |
| 9,679,750 B2 | 6/2017 | Choi et al. |
| 10,100,200 B2 | 10/2018 | Johnson et al. |
| 10,138,378 B2 | 11/2018 | Hoermmann et al. |
| 10,370,539 B2 | 8/2019 | Johnson et al. |
| 10,618,026 B2 | 4/2020 | Taylor et al. |
| 10,808,097 B2 | 10/2020 | Hardman et al. |
| 11,149,148 B2 | 10/2021 | Taylor et al. |
| 11,203,692 B2 | 12/2021 | Hoermann et al. |
| 11,304,288 B2 | 4/2022 | Hoermann et al. |
| 11,453,784 B2 | 9/2022 | Hardman et al. |
| 11,492,496 B2 | 11/2022 | Hoermann et al. |
| 11,591,477 B2 | 2/2023 | Johnson et al. |
| 11,665,808 B2 | 5/2023 | Moss et al. |
| 2001/0029888 A1 | 10/2001 | Sundarrajan et al. |
| 2001/0039797 A1 | 11/2001 | Cheng |
| 2002/0000085 A1 | 1/2002 | Hall et al. |
| 2002/0021430 A1 | 2/2002 | Koshelev et al. |
| 2002/0050323 A1 | 5/2002 | Moisan et al. |
| 2002/0051903 A1 | 5/2002 | Masuko et al. |
| 2002/0141476 A1 | 10/2002 | Varela |
| 2002/0157559 A1 | 10/2002 | Brunet et al. |
| 2003/0103858 A1 | 6/2003 | Baran et al. |
| 2003/0136661 A1 | 7/2003 | Kong et al. |
| 2003/0152184 A1 | 8/2003 | Shehane et al. |
| 2004/0045808 A1 | 3/2004 | Fabry et al. |
| 2004/0047779 A1 | 3/2004 | Denison |
| 2004/0071626 A1 | 4/2004 | Smith et al. |
| 2004/0081609 A1 | 4/2004 | Green et al. |
| 2004/0081862 A1 | 4/2004 | Herman |
| 2004/0148860 A1 | 8/2004 | Fletcher |
| 2004/0168904 A1 | 9/2004 | Anazawa et al. |
| 2004/0211760 A1 | 10/2004 | Delzenne et al. |
| 2004/0213728 A1 | 10/2004 | Kopietz et al. |
| 2004/0216559 A1 | 11/2004 | Kim et al. |
| 2004/0247509 A1 | 12/2004 | Newby |
| 2005/0063892 A1 | 3/2005 | Tandon et al. |
| 2005/0063893 A1 | 3/2005 | Ayala et al. |
| 2005/0079119 A1 | 4/2005 | Kawakami et al. |
| 2005/0230240 A1 | 10/2005 | Dubrovsky et al. |
| 2006/0034748 A1 | 2/2006 | Lewis et al. |
| 2006/0037244 A1 | 2/2006 | Clawson |
| 2006/0068987 A1 | 3/2006 | Bollepalli et al. |
| 2006/0107789 A1 | 5/2006 | Deegan et al. |
| 2006/0155157 A1 | 7/2006 | Zarrinpashne et al. |
| 2006/0226538 A1 | 10/2006 | Kawata |
| 2006/0228290 A1 | 10/2006 | Green |
| 2006/0239890 A1 | 10/2006 | Chang et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2007/0293405 A1 | 12/2007 | Zhang et al. |
| 2008/0041829 A1 | 2/2008 | Blutke et al. |
| 2008/0121624 A1 | 5/2008 | Belashchenko et al. |
| 2008/0159947 A1 | 7/2008 | Yurovskaya et al. |
| 2008/0169183 A1 | 7/2008 | Hertel et al. |
| 2008/0182298 A1 | 7/2008 | Day |
| 2008/0226538 A1 | 9/2008 | Rumpf et al. |
| 2008/0233402 A1 | 9/2008 | Carlson et al. |
| 2008/0263954 A1 | 10/2008 | Hammel et al. |
| 2008/0279749 A1 | 11/2008 | Probst et al. |
| 2008/0292533 A1 | 11/2008 | Belmont et al. |
| 2009/0014423 A1 | 1/2009 | Li et al. |
| 2009/0035469 A1 | 2/2009 | Sue et al. |
| 2009/0090282 A1 | 4/2009 | Gold et al. |
| 2009/0142250 A1 | 6/2009 | Fabry et al. |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0055017 A1 | 3/2010 | Vanier et al. |
| 2010/0147188 A1 | 6/2010 | Mamak et al. |
| 2010/0249353 A1 | 9/2010 | Macintosh et al. |
| 2011/0036014 A1 | 2/2011 | Tsangaris et al. |
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0089115 A1 | 4/2011 | Lu |
| 2011/0120137 A1 | 5/2011 | Ennis |
| 2011/0138766 A1 | 6/2011 | Elkady et al. |
| 2011/0150756 A1 | 6/2011 | Adams et al. |
| 2011/0155703 A1 | 6/2011 | Winn |
| 2011/0180513 A1 | 7/2011 | Luhrs et al. |
| 2011/0214425 A1 | 9/2011 | Lang et al. |
| 2011/0217229 A1 | 9/2011 | Inomata et al. |
| 2011/0236816 A1 | 9/2011 | Stanyschofsky et al. |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0177531 A1 | 7/2012 | Chuang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |

(56) References Cited

U.S. PATENT DOCUMENTS

| | | |
|---|---|---|
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0105739 A1 | 5/2013 | Bingue et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0057166 A1 | 2/2014 | Yokoyama et al. |
| 2014/0131324 A1 | 5/2014 | Shipulski et al. |
| 2014/0151601 A1 | 6/2014 | Hyde et al. |
| 2014/0166496 A1 | 6/2014 | Lin et al. |
| 2014/0190179 A1 | 7/2014 | Baker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0339478 A1 | 11/2014 | Probst et al. |
| 2014/0345828 A1 | 11/2014 | Ehmann et al. |
| 2014/0357092 A1 | 12/2014 | Singh |
| 2014/0373752 A2 | 12/2014 | Hassinen et al. |
| 2015/0004516 A1 | 1/2015 | Kim et al. |
| 2015/0044105 A1 | 2/2015 | Novoselov |
| 2015/0044516 A1 | 2/2015 | Kyrlidis et al. |
| 2015/0056127 A1 | 2/2015 | Chavan et al. |
| 2015/0056516 A1 | 2/2015 | Hellring et al. |
| 2015/0064099 A1 | 3/2015 | Nester et al. |
| 2015/0087764 A1 | 3/2015 | Sanchez Garcia et al. |
| 2015/0180346 A1 | 6/2015 | Yuzurihara et al. |
| 2015/0210856 A1 | 7/2015 | Johnson et al. |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2015/0259211 A9 | 9/2015 | Hung et al. |
| 2015/0307351 A1 | 10/2015 | Mabrouk et al. |
| 2016/0030856 A1 | 2/2016 | Kaplan et al. |
| 2016/0152469 A1 | 6/2016 | Chakravarti et al. |
| 2016/0243518 A1 | 8/2016 | Spitzl |
| 2016/0293959 A1 | 10/2016 | Blizanac et al. |
| 2016/0296905 A1 | 10/2016 | Kuhl |
| 2016/0319110 A1 | 11/2016 | Matheu et al. |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0117538 A1 | 4/2017 | Bendimerad et al. |
| 2017/0349758 A1 | 12/2017 | Johnson et al. |
| 2018/0015438 A1 | 1/2018 | Taylor et al. |
| 2018/0016441 A1 | 1/2018 | Taylor et al. |
| 2018/0022925 A1 | 1/2018 | Hardman et al. |
| 2018/0340074 A1 | 11/2018 | Wittmann et al. |
| 2018/0366734 A1 | 12/2018 | Korchev et al. |
| 2019/0048200 A1 | 2/2019 | Johnson et al. |
| 2019/0100658 A1 | 4/2019 | Taylor et al. |
| 2020/0239696 A1 | 7/2020 | Johnson et al. |
| 2020/0239697 A1 | 7/2020 | Wittmann et al. |
| 2020/0291237 A1 | 9/2020 | Hardman et al. |
| 2021/0017025 A1 | 1/2021 | Hardman |
| 2021/0017031 A1 | 1/2021 | Hardman et al. |
| 2021/0020947 A1 | 1/2021 | Hardman et al. |
| 2021/0071007 A1 | 3/2021 | Hardman et al. |
| 2021/0261417 A1 | 8/2021 | Cardinal et al. |
| 2022/0272826 A1 | 8/2022 | Hoermann et al. |
| 2022/0274046 A1 | 9/2022 | Johnson et al. |
| 2023/0136364 A1 | 5/2023 | Johnson et al. |
| 2023/0154640 A1 | 5/2023 | Ned et al. |
| 2023/0212401 A1 | 7/2023 | Hardman et al. |
| 2023/0357021 A1 | 11/2023 | Hanson et al. |

FOREIGN PATENT DOCUMENTS

| | | |
|---|---|---|
| CA | 830378 A | 12/1969 |
| CA | 964405 A | 3/1975 |
| CA | 2353752 A1 | 1/2003 |
| CA | 2621749 A1 | 8/2009 |
| CN | 85201622 U | 7/1986 |
| CN | 86104761 A | 2/1987 |
| CN | 85109166 A | 4/1987 |
| CN | 1059541 A | 3/1992 |
| CN | 1076206 A | 9/1993 |
| CN | 1077329 A | 10/1993 |
| CN | 1078727 A | 11/1993 |
| CN | 1082571 A | 2/1994 |
| CN | 1086527 A | 5/1994 |
| CN | 1196032 A | 10/1998 |
| CN | 1398780 A | 2/2003 |
| CN | 1458966 A | 11/2003 |
| CN | 1491740 A | 4/2004 |
| CN | 1644650 A | 7/2005 |
| CN | 1656632 A | 8/2005 |
| CN | 1825531 A | 8/2006 |
| CN | 1833313 A | 9/2006 |
| CN | 101092691 A | 12/2007 |
| CN | 101143296 A | 3/2008 |
| CN | 101193817 A | 6/2008 |
| CN | 101198442 A | 6/2008 |
| CN | 201087175 Y | 7/2008 |
| CN | 201143494 Y | 11/2008 |
| CN | 101368010 A | 2/2009 |
| CN | 101529606 A | 9/2009 |
| CN | 101534930 A | 9/2009 |
| CN | 101657283 A | 2/2010 |
| CN | 101734620 A | 6/2010 |
| CN | 101946080 A | 1/2011 |
| CN | 101958221 A | 1/2011 |
| CN | 102007186 A | 4/2011 |
| CN | 102060281 A | 5/2011 |
| CN | 102108216 A | 6/2011 |
| CN | 102186767 A | 9/2011 |
| CN | 102350506 A | 2/2012 |
| CN | 102612549 A | 7/2012 |
| CN | 102666686 A | 9/2012 |
| CN | 102702801 A | 10/2012 |
| CN | 202610344 U | 12/2012 |
| CN | 102869730 A | 1/2013 |
| CN | 102993788 A | 3/2013 |
| CN | 103108831 A | 5/2013 |
| CN | 103160149 A | 6/2013 |
| CN | 103391678 A | 11/2013 |
| CN | 203269847 U | 11/2013 |
| CN | 203415580 U | 1/2014 |
| CN | 204301483 U | 4/2015 |
| CN | 104798228 A | 7/2015 |
| CN | 105070518 A | 11/2015 |
| CN | 105073906 A | 11/2015 |
| CN | 105308775 A | 2/2016 |
| CN | 205472672 U | 8/2016 |
| CN | 107709474 A | 2/2018 |
| DE | 211457 A3 | 7/1984 |
| DE | 19807224 A1 | 8/1999 |
| EA | 200300389 A1 | 12/2003 |
| EP | 0315442 A2 | 5/1989 |
| EP | 0325689 A1 | 8/1989 |
| EP | 0616600 A1 | 9/1994 |
| EP | 0635044 B1 | 2/1996 |
| EP | 0635043 B1 | 6/1996 |
| EP | 0861300 A1 | 9/1998 |
| EP | 0982378 A1 | 3/2000 |
| EP | 1017622 A1 | 7/2000 |
| EP | 1088854 A2 | 4/2001 |
| EP | 1188801 A1 | 3/2002 |
| EP | 3099397 A1 | 12/2016 |
| EP | 3100597 A2 | 12/2016 |
| EP | 3253826 A1 | 12/2017 |
| EP | 3253827 A1 | 12/2017 |
| EP | 3253904 A1 | 12/2017 |
| EP | 3331821 A1 | 6/2018 |
| EP | 3347306 A1 | 7/2018 |

(56) References Cited

FOREIGN PATENT DOCUMENTS

| | | |
|---|---|---|
| EP | 3350855 A1 | 7/2018 |
| EP | 3448553 A1 | 3/2019 |
| EP | 3448936 A1 | 3/2019 |
| EP | 3592810 A1 | 1/2020 |
| EP | 3612600 A1 | 2/2020 |
| EP | 3676220 A1 | 7/2020 |
| EP | 3676335 A1 | 7/2020 |
| EP | 3676901 A1 | 7/2020 |
| EP | 3700980 A1 | 9/2020 |
| EP | 3774020 A1 | 2/2021 |
| EP | 4225698 A1 | 8/2023 |
| FR | 1249094 A | 12/1960 |
| FR | 2891434 A1 | 3/2007 |
| FR | 2937029 A1 | 4/2010 |
| GB | 395893 A | 7/1933 |
| GB | 987498 A | 3/1965 |
| GB | 1068519 A | 5/1967 |
| GB | 1291487 A | 10/1972 |
| GB | 1400266 A | 7/1975 |
| GB | 1492346 A | 11/1977 |
| GB | 2419883 A | 5/2006 |
| JP | S5021983 B1 | 7/1975 |
| JP | S5987800 A | 5/1984 |
| JP | S6411074 A | 1/1989 |
| JP | H04228270 A | 8/1992 |
| JP | H05226096 A | 9/1993 |
| JP | H06302527 A | 10/1994 |
| JP | H06322615 A | 11/1994 |
| JP | H07500695 A | 1/1995 |
| JP | H07307165 A | 11/1995 |
| JP | H08176463 A | 7/1996 |
| JP | H08319552 A | 12/1996 |
| JP | H09316645 A | 12/1997 |
| JP | H11123562 A | 5/1999 |
| JP | 2001164053 A | 6/2001 |
| JP | 2001253974 A | 9/2001 |
| JP | 2002121422 A | 4/2002 |
| JP | 2004300334 A | 10/2004 |
| JP | 3636623 B2 | 4/2005 |
| JP | 2005235709 A | 9/2005 |
| JP | 2005243410 A | 9/2005 |
| JP | 5226096 B2 | 7/2013 |
| KR | 20030046455 A | 6/2003 |
| KR | 20080105344 A | 12/2008 |
| KR | 20140022263 A | 2/2014 |
| KR | 20140075261 A | 6/2014 |
| KR | 20150121142 A | 10/2015 |
| KR | 20170031061 A | 3/2017 |
| RU | 2425795 C2 | 8/2011 |
| RU | 2488984 C2 | 7/2013 |
| TW | 200418933 A | 10/2004 |
| WO | WO-9004852 A1 | 5/1990 |
| WO | WO-9204415 A1 | 3/1992 |
| WO | WO-9312030 A1 | 6/1993 |
| WO | WO-9312031 A1 | 6/1993 |
| WO | WO-9312633 A1 | 6/1993 |
| WO | WO-9318094 A1 | 9/1993 |
| WO | WO-9320152 A1 | 10/1993 |
| WO | WO-9320153 A1 | 10/1993 |
| WO | WO-9323331 A1 | 11/1993 |
| WO | WO-9408747 A1 | 4/1994 |
| WO | WO-9618688 A1 | 6/1996 |
| WO | WO-9703133 A1 | 1/1997 |
| WO | WO-9813428 A1 | 4/1998 |
| WO | WO-0018682 A1 | 4/2000 |
| WO | WO-0224819 A1 | 3/2002 |
| WO | WO-03014018 A1 | 2/2003 |
| WO | WO-2004083119 A1 | 9/2004 |
| WO | WO-2005054378 A1 | 6/2005 |
| WO | WO-2007016418 A2 | 2/2007 |
| WO | WO-2009143576 A1 | 12/2009 |
| WO | WO-2010040840 A2 | 4/2010 |
| WO | WO-2010059225 A1 | 5/2010 |
| WO | WO-2012015313 A1 | 2/2012 |
| WO | WO-2012067546 A2 | 5/2012 |
| WO | WO-2012094743 A1 | 7/2012 |
| WO | WO-2012149170 A1 | 11/2012 |
| WO | WO-2013134093 A1 | 9/2013 |
| WO | WO-2013184074 A1 | 12/2013 |
| WO | WO-2013185219 A1 | 12/2013 |
| WO | WO-2014000108 A1 | 1/2014 |
| WO | WO-2014012169 A1 | 1/2014 |
| WO | WO-2014149455 A1 | 9/2014 |
| WO | WO-2015049008 A1 | 4/2015 |
| WO | WO-2015051893 A1 | 4/2015 |
| WO | WO-2015051898 A1 | 4/2015 |
| WO | WO-2015093947 A1 | 6/2015 |
| WO | WO-2015116797 A1 | 8/2015 |
| WO | WO-2015116798 A1 | 8/2015 |
| WO | WO-2015116800 A1 | 8/2015 |
| WO | WO-2015116807 A1 | 8/2015 |
| WO | WO-2015116811 A1 | 8/2015 |
| WO | WO-2015116943 A2 | 8/2015 |
| WO | WO-2016012367 A1 | 1/2016 |
| WO | WO-2016014641 A1 | 1/2016 |
| WO | WO-2016126598 A1 | 8/2016 |
| WO | WO-2016126599 A1 | 8/2016 |
| WO | WO-2016126600 A1 | 8/2016 |
| WO | WO-2017019683 A1 | 2/2017 |
| WO | WO-2017027385 A1 | 2/2017 |
| WO | WO-2017034980 A1 | 3/2017 |
| WO | WO-2017044594 A1 | 3/2017 |
| WO | WO-2017048621 A1 | 3/2017 |
| WO | WO-2017190015 A1 | 11/2017 |
| WO | WO-2017190045 A1 | 11/2017 |
| WO | WO-2018165483 A1 | 9/2018 |
| WO | WO-2018195460 A1 | 10/2018 |
| WO | WO-2019046320 A1 | 3/2019 |
| WO | WO-2019046322 A1 | 3/2019 |
| WO | WO-2019046324 A1 | 3/2019 |
| WO | WO-2019084200 A1 | 5/2019 |
| WO | WO-2019195461 A1 | 10/2019 |
| WO | WO-2022076306 | 4/2022 |
| WO | WO-2023059520 | 4/2023 |
| WO | WO-2023137120 A1 | 7/2023 |
| WO | WO-2023235486 A1 | 12/2023 |

OTHER PUBLICATIONS

ASTM International: Standard Test Method for Carbon Black—Morphological Characterization of Carbon Black Using Electron Microscopy, D3849-07 (2011); 7 Pages.
Ayala, et al., Carbon Black Elastomer Interaction. Rubber Chemistry and Technology (1991): 19-39.
Bakken, et al., Thermal plasma process development in Norway. Pure and Applied Chemistry 70.6 (1998): 1223-1228.
Biscoe, et al., An X-ray study of carbon black. Journal of Applied physics, 1942; 13: 364-371.
Boehm, Some Aspects of Surface Chemistry of Carbon Blacks and Other Carbons. Carbon. 32.5. (1994): 759-769.
Breeze, Raising steam plant efficiency-Pushing the steam cycle boundaries.PEI Magazine 20.4 (2012) 12 pages.
Carmer, et al., Formation of silicon carbide particles behind shock waves. Appl. Phys. Lett. 54 (15), Apr. 10, 1989. 1430-1432.
Cataldo, The impact of a fullerene-like concept in carbon black science. Carbon 40 (2002): 157-162.
Chiesa, et al., Using Hydrogen as Gas Turbine Fuel. ASME. J. Eng. Gas Turbines Power 127.1. (2005):73-80. doi:10.1115/1.1787513.
Cho, et al., Conversion of natural gas to hydrogen and carbon black by plasma and application of plasma black. Symposia-American Chemical Society, Div. Fuel Chem. 49.1. (2004): 181-183.
Co-pending U.S. Appl. No. 16/807,550, inventors Taylor; Roscoe W. et al., filed Mar. 3, 2020.
Co-pending U.S. Appl. No. 17/021,197, inventors Hardman; Ned J. et al., filed Sep. 15, 2020.
Co-pending U.S. Appl. No. 17/031,484, inventors Johnson; Peter L. et al., filed Sep. 24, 2020.
Co-pending U.S. Appl. No. 17/072,416, inventors Taylor; Roscoe W. et al., filed Oct. 16, 2020.
Co-pending U.S. Appl. No. 17/239,041, inventors Hardmanned; J. et al., filed Apr. 23, 2021.

(56) References Cited

OTHER PUBLICATIONS

Co-pending U.S. Appl. No. 17/245,296, inventors Johnsonpeter; L. et al., filed Apr. 30, 2021.
Co-pending U.S. Appl. No. 17/329,532, inventors Taylorroscoe; W. et al., filed May 25, 2021.
Co-pending U.S. Appl. No. 17/412,913, inventors Johnson; Peter L. et al., filed Aug. 26, 2021.
Co-pending U.S. Appl. No. 17/473,106, inventors Taylorroscoe; W. et al., filed Sep. 13, 2021.
Co-pending U.S. Appl. No. 17/487,982, inventors Hoermannalexander; F. et al., filed Sep. 28, 2021.
Co-pending U.S. Appl. No. 17/529,928, inventors Hardmanned; J. et al., filed Nov. 18, 2021.
Co-pending U.S. Appl. No. 17/741,161, inventors Hoermann; Alexander F. et al., filed May 10, 2022.
Co-pending U.S. Appl. No. 17/862,242, inventors Hardman; Ned J. et al., filed Jul. 11, 2022.
Co-pending U.S. Appl. No. 17/938,304, inventors Roscoe; W. Taylor et al., filed Oct. 5, 2022.
Co-pending U.S. Appl. No. 17/938,591, inventors Alexander; F. Hoermann et al., filed Oct. 6, 2022.
Co-pending U.S. Appl. No. 18/066,929, inventor Alexander; F. Hoermann, filed Dec. 15, 2022.
Co-pending U.S. Appl. No. 18/137,918, inventors John; Jared Moss et al., filed Apr. 21, 2023.
Co-pending U.S. Appl. No. 18/172,835, inventor Ned; J. Hardman, filed Feb. 22, 2023.
Co-pending U.S. Appl. No. 18/205,384, inventors Ned; J. Hardman et al., filed Jun. 2, 2023.
Co-pending U.S. Appl. No. 18/295,584, inventors Robert; J. Hanson et al., filed Apr. 4, 2023.
Database WPI, Week 200323, 2017 Clarivate Analytics. Thomson Scientific, London, GB; Database accession No. 2003-239603, XP002781693.
Donnet, et al., Carbon Black. New York: Marcel Dekker, (1993): 46, 47 and 54.
Donnet, et al., Observation of Plasma-Treated Carbon Black Surfaces by Scanning Tunnelling Microscopy. Carbon (1994) 32(2): 199-206.
EP16845031.0 Extended European Search Report dated Mar. 18, 2019.
EP16847102.7 Extended European Search Report dated Jul. 5, 2019.
EP17790549.4 Extended European Search Report dated Nov. 26, 2019.
EP17790570.0 Extended European Search Report dated Nov. 8, 2019.
EP18764428.1 Extended European Search Report dated Jan. 11, 2021.
EP18788086.9 Extended European Search Report dated Jan. 11, 2021.
EP18850029.2 Extended European Search Report dated Apr. 29, 2021.
EP18850502.8 Extended European Search Report dated Feb. 25, 2021.
EP18851605.8 Extended European Search Report dated Feb. 25, 2021.
EP18869902.9 Extended European Search Report dated Mar. 19, 2021.
EP19780959.3 Extended European Search Report dated Dec. 21, 2021.
Extended European Search Report for EP Application No. 15742910.1 dated Jul. 18, 2017.
Extended European Search Report for EP Application No. 15743214.7 dated Jan. 16, 2018.
Extended European Search Report for EP Application No. 16747055.8, dated Jun. 27, 2018.
Extended European Search Report for EP Application No. 16747056.6 dated Jun. 27, 2018.
Extended European Search Report for EP Application No. 16747057.4 dated Oct. 9, 2018.
Extended European Search Report for EP Application No. 16835697.0 dated Nov. 28, 2018.
Fabry, et al., Carbon black processing by thermal plasma. Analysis of the particle formation mechanism. Chemical Engineering Science 56.6 (2001): 2123-2132.
Frenklach, et al., Silicon carbide and the origin of interstellar carbon grains. Nature, vol. 339; May 18, 1989: 196-198.
Fulcheri, et al., From methane to hydrogen, carbon black and water. International journal of hydrogen energy 20.3 (1995): 197-202.
Fulcheri, et al., Plasma processing: a step towards the production of new grades of carbon black. Carbon 40.2 (2002): 169-176.
Gago, et al., Growth mechanisms and structure of fullerene-like carbon-based thin films: superelastic materials for tribological applications. Trends in Fullerene Research, Published by Nova Science Publishers, Inc. (2007): 1-46.
Garberg, et al., A transmission electron microscope and electron diffraction study of carbon nanodisks. Carbon 46.12 (2008): 1535-1543.
Gomez-Pozuelo, et al., Hydrogen production by catalytic methane decomposition over rice husk derived silica. Fuel, Dec. 15, 2021; 306: 121697.
Grivei, et al., A clean process for carbon nanoparticles and hydrogen production from plasma hydrocarbon cracking. Publishable Report, European Commission JOULE III Programme, Project No. JOE3-CT97-0057, circa (2000): 1-25.
Hernandez, et al. Comparison of carbon nanotubes and nanodisks as percolative fillers in electrically conductive composites. Scripta Materialia 58 (2008) 69-72.
Hoyer, et al., Microelectromechanical strain and pressure sensors based on electric field aligned carbon cone and carbon black particles in a silicone elastomer matrix. Journal of Applied Physics 112.9 (2012): 094324.
International Preliminary Report on Patentability for Application No. PCT/US2015/013482 dated Aug. 2, 2016.
International Preliminary Report on Patentability for Application No. PCT/US2015/013484 dated Aug. 2, 2016.
International Preliminary Report on Patentability for Application No. PCT/US2015/013487 dated Aug. 2, 2016.
International Preliminary Report on Patentability for Application No. PCT/US2015/013505 dated Aug. 2, 2016.
International Preliminary Report on Patentability for Application No. PCT/US2015/013510 dated Aug. 2, 2016.
International Preliminary Report on Patentability for Application No. PCT/US2017/030139 dated Oct. 30, 2018.
International Preliminary Report on Patentability for Application No. PCT/US2017/030179 dated Oct. 30, 2018.
International Search Report and Written Opinion for Application No. PCT/US2015/013482 dated Jun. 17, 2015.
International Search Report and Written Opinion for Application No. PCT/US2015/013484 dated Apr. 22, 2015.
International Search Report and Written Opinion for Application No. PCT/US2015/013487 dated Jun. 16, 2015.
International Search Report and Written Opinion for Application No. PCT/US2015/013505 dated May 11, 2015.
International Search Report and Written Opinion for Application No. PCT/US2015/013510 dated Apr. 22, 2015.
International Search Report and Written Opinion for Application No. PCT/US2015/013794 dated Jun. 19, 2015.
International Search Report and Written Opinion for Application No. PCT/US2016/015939 dated Jun. 3, 2016.
International Search Report and Written Opinion for Application No. PCT/US2016/015941 dated Apr. 21, 2016.
International Search Report and Written Opinion for Application No. PCT/US2016/015942 dated Apr. 11, 2016.
International search Report and Written Opinion for Application No. PCT/US2016/044039 dated Oct. 6, 2016.
International Search Report and Written Opinion for Application No. PCT/US2016/045793 dated Oct. 18, 2016.
International Search Report and Written Opinion for Application No. PCT/US2016/047769 dated Dec. 30, 2016.

(56) References Cited

OTHER PUBLICATIONS

International Search Report and Written Opinion for Application No. PCT/US2016/050728 dated Nov. 18, 2016.
International search Report and Written Opinion for Application No. PCT/US2016/051261 dated Nov. 18, 2016.
International Search Report and Written Opinion for Application No. PCT/US2017/030139 dated Jul. 19, 2017.
International Search Report and Written Opinion for Application No. PCT/US2017/030179 dated Jul. 27, 2017.
International Search Report and Written Opinion for Application No. PCT/US2018/021627 dated May 31, 2018.
International Search Report and Written Opinion for Application No. PCT/US2018/028619 dated Aug. 9, 2018.
International Search Report and Written Opinion for Application No. PCT/US2018/048374 dated Nov. 21, 2018.
International Search Report and Written Opinion for Application No. PCT/US2018/048378 dated Dec. 20, 2018.
International Search Report and Written Opinion for Application No. PCT/US2018/048381 dated Dec. 14, 2018.
International Search Report for Application No. PCT/US2015/13482 dated Jun. 17, 2015.
International Search Report for Application No. PCT/US2015/13487 dated Jun. 16, 2015.
Invitation to Pay Additional Fees in PCT/US2018/028619 dated Jun. 18, 2018.
Invitation to Pay Additional Fees in PCT/US2018/048378 dated Oct. 26, 2018.
Invitation to Pay Additional Fees in PCT/US2018/048381 dated Oct. 9, 2018.
Invitation to Pay Additional Fees in PCT/US2018/057401 dated Dec. 19, 2018.
Knaapila, et al., Directed assembly of carbon nanocones into wires with an epoxy coating in thin films by a combination of electric field alignment and subsequent pyrolysis. Carbon 49.10 (2011): 3171-3178.
Krishnan, et al., Graphitic cones and the nucleation of curved carbon surfaces. Nature 388.6641 (1997): 451-454.
Larouche, et al., Nitrogen Functionalization of Carbon Black in a Thermo-Convective Plasma Reactor. Plasma Chem Plasma Process (2011) 31: 635-647.
Lee, et al., Application of Thermal Plasma for Production of Hydrogen and Carbon Black from Direct Decomposition of Hydrocarbon, Appl. Chem. Eng., vol. 18, No. 1, Feb. 2007, pp. 84-89.
Long C. M., et al., "Carbon black vs. black carbon and other airborne materials containing elemental carbon: Physical and chemical distinctions", Environmental Pollution, 2013, 181, pp. 271-286. https://doi.org/10.1016/j.envpol.2013.06.009.
Medalia, et al., Tinting Strength of Carbon Black. Journal of Colloid and Interface Science 40.2. (1972).
Naess, et al., Carbon nanocones: wall structure and morphology. Science and Technology of advanced materials (2009): 7 pages.
PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
PCT/US2021/053371 International Search Report and Written Opinion dated Feb. 17, 2022.
PCT/US2022/045451 International Search Report and Written Opinion dated Feb. 17, 2023.
PCT/US2023/010695 International Search Report and Written Opinion dated Jun. 22, 2023.
Polman, et al., Reduction of CO2 emissions by adding hydrogen to natural gas. IEA Green House Gas R&D programme (2003): 1-98.
Pristavita, et al. Carbon blacks produced by thermal plasma: the influence of the reactor geometry on the product morphology. Plasma Chemistry and Plasma Processing 30.2 (2010): 267-279.
Pristavita, et al., Carbon nanoparticle production by inductively coupled thermal plasmas: controlling the thermal history of particle nucleation. Plasma Chemistry and Plasma Processing 31.6 (2011): 851-866.
Pristavita, et al., Volatile Compounds Present in Carbon Blacks Produced by Thermal Plasmas. Plasma Chemistry and Plasma Processing 31.6 (2011): 839-850.
Reese, Resurgence in American manufacturing will be led by the rubber and tire industry. Rubber World. 255. (2017): 18-21 and 23.
Reynolds, Electrode Resistance: How Important is Surface Area. Oct. 10, 2016. p. 3 para[0001]; Figure 3; Retrieved from http://electrotishing.net/2016/10/10/electrode-resistance-how-important-is-surface-area/ on May 8, 2018.
Search Report for Application No. RU2016135213 dated Feb. 12, 2018.
Separation of Flow. (2005). Aerospace, Mechanical & Mechatronic Engg. Retrieved Jul. 16, 2020, from http://www-mdp.eng.cam.ac.uk/web/library/enginfo/aerothermal_dvd_only/aero/fprops/introvisc/node9.html.
Sun, et al., Preparation of carbon black via arc discharge plasma enhanced by thermal pyrolysis. Diamond & Related Materials (2015), doi: 10.1016/j.diamond.2015.11.004, 47 pages.
Supplementary Partial European Search Report for EP Application No. 15743214.7 dated Sep. 12, 2017.
Translation of Official Notification of RU Application No. 2016135213 dated Feb. 12, 2018.
Tsujikawa, et al., Analysis of a gas turbine and steam turbine combined cycle with liquefied hydrogen as fuel. International Journal of Hydrogen Energy 7.6 (1982): 499-505.
U.S. Appl. No. 16/657,386 Notice of Allowance dated May 20, 2022.
U.S. Appl. No. 14/591,541 Notice of Allowance dated Sep. 17, 2018.
U.S. Environmental Protection Agency, Guide to Industrial Assessments for Pollution Prevention and Energy Efficiency. EPA 625/R-99/003 (1999): 474 pages.
U.S. Appl. No. 15/548,348 Office Action dated Apr. 25, 2019.
U.S. Appl. No. 14/591,476 Notice of Allowance dated Mar. 20, 2019.
U.S. Appl. No. 14/591,476 Office Action dated Feb. 27, 2017.
U.S. Appl. No. 14/591,476 Office Action dated Jul. 11, 2016.
U.S. Appl. No. 14/591,476 Office Action dated Jun. 7, 2018.
U.S. Appl. No. 14/591,476 Office Action dated Mar. 16, 2016.
U.S. Appl. No. 14/591,476 Office Action dated Oct. 13, 2017.
U.S. Appl. No. 14/591,528 Office Action dated Jan. 16, 2018.
U.S. Appl. No. 14/591,528 Office Action dated Jan. 17, 2019.
U.S. Appl. No. 14/591,528 Office Action dated Oct. 28, 2019.
U.S. Appl. No. 14/591,528 Office Action dated Sep. 11, 2020.
U.S. Appl. No. 14/591,541 Notice of Allowance dated Jun. 7, 2018.
U.S. Appl. No. 14/591,541 Office Action dated Feb. 22, 2017.
U.S. Appl. No. 14/591,541 Office Action dated Jul. 14, 2016.
U.S. Appl. No. 14/591,541 Office Action dated Mar. 16, 2016.
U.S. Appl. No. 14/591,541 Office Action dated Oct. 13, 2017.
U.S. Appl. No. 14/601,761 Corrected Notice of Allowance dated Feb. 9, 2018.
U.S. Appl. No. 14/601,761 Ex Parte Quayle Actionn dated May 19, 2017.
U.S. Appl. No. 14/601,761 Notice of Allowance dated Feb. 9, 2018.
U.S. Appl. No. 14/601,761 Notice of Allowance dated Jan. 18, 2018.
U.S. Appl. No. 14/601,761 Notice of Allowance dated Jun. 19, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 14/601,761 Office Action dated Apr. 14, 2016.
U.S. Appl. No. 14/601,761 Office Action dated Oct. 19, 2016.
U.S. Appl. No. 14/601,793 Notice of Allowance dated Oct. 7, 2016.
U.S. Appl. No. 14/601,793 Office Action dated Apr. 13, 2016.
U.S. Appl. No. 14/601,793 Office Action dated Aug. 3, 2016.
U.S. Appl. No. 14/610,299 Notice of Allowance dated Dec. 13, 2021.

(56) References Cited

OTHER PUBLICATIONS

U.S. Appl. No. 14/610,299 Notice of Allowance dated Feb. 20, 2020.
U.S. Appl. No. 14/610,299 Notice of Allowance dated Nov. 16, 2021.
U.S. Appl. No. 14/610,299 Office Action dated Feb. 17, 2021.
U.S. Appl. No. 14/610,299 Office Action dated May 2, 2017.
U.S. Appl. No. 14/610,299 Office Action dated Sep. 25, 2018.
U.S. Appl. No. 15/221,088 Office Action dated Apr. 20, 2018.
U.S. Appl. No. 15/221,088 Office Action dated Dec. 23, 2016.
U.S. Appl. No. 15/221,088 Office Action dated Dec. 4, 2019.
U.S. Appl. No. 15/221,088 Office Action dated Mar. 7, 2019.
U.S. Appl. No. 15/221,088 Office Action dated Sep. 19, 2017.
U.S. Appl. No. 15/229,608 Office Action dated Apr. 4, 2022.
U.S. Appl. No. 15/229,608 Office Action dated Apr. 8, 2019.
U.S. Appl. No. 15/229,608 Office Action dated Feb. 1, 2021.
U.S. Appl. No. 15/229,608 Office Action dated Jun. 29, 2023.
U.S. Appl. No. 15/229,608 Office Action dated May 15, 2020.
U.S. Appl. No. 15/229,608 Office Action dated Nov. 28, 2022.
U.S. Appl. No. 15/229,608 Office Action dated Oct. 25, 2019.
U.S. Appl. No. 15/241,771 Office Action dated Dec. 16, 2022.
U.S. Appl. No. 15/241,771 Office Action dated Dec. 30, 2021.
U.S. Appl. No. 15/241,771 Office Action dated Jan. 18, 2023.
U.S. Appl. No. 15/241,771 Office Action dated Jul. 18, 2022.
U.S. Appl. No. 15/241,771 Office Action dated Jul. 6, 2018.
U.S. Appl. No. 15/241,771 Office Action dated Mar. 13, 2019.
U.S. Appl. No. 15/241,771 Office Action dated May 1, 2020.
U.S. Appl. No. 15/241,771 Office Action dated Sep. 25, 2019.
U.S. Appl. No. 15/259,884 Office Action dated Feb. 25, 2020.
U.S. Appl. No. 15/259,884 Office Action dated Jan. 9, 2018.
U.S. Appl. No. 15/259,884 Office Action dated Jun. 18, 2021.
U.S. Appl. No. 15/259,884 Office Action dated Mar. 4, 2022.
U.S. Appl. No. 15/259,884 Office Action dated May 31, 2019.
U.S. Appl. No. 15/259,884 Office Action dated Oct. 11, 2018.
U.S. Appl. No. 15/262,539 Notice of Allowance dated Jul. 23, 2020.
U.S. Appl. No. 15/262,539 Notice of Allowance dated Jun. 18, 2020.
U.S. Appl. No. 15/262,539 Office Action dated Jun. 1, 2018.
U.S. Appl. No. 15/262,539 Office Action dated Jan. 4, 2019.
U.S. Appl. No. 15/262,539 Office Action dated Sep. 19, 2019.
U.S. Appl. No. 15/410,283 Office Action dated Jan. 16, 2020.
U.S. Appl. No. 15/410,283 Office Action dated Jul. 31, 2020.
U.S. Appl. No. 15/410,283 Office Action dated Jun. 7, 2018.
U.S. Appl. No. 15/410,283 Office Action dated Mar. 12, 2019.
U.S. Appl. No. 15/548,346 Office Action dated Jul. 16, 2021.
U.S. Appl. No. 15/548,346 Office Action dated Jun. 5, 2023.
U.S. Appl. No. 15/548,346 Office Action dated Mar. 18, 2022.
U.S. Appl. No. 15/548,346 Office Action dated May 4, 2020.
U.S. Appl. No. 15/548,346 Office Action dated Oct. 22, 2019.
U.S. Appl. No. 15/548,346 Office Action dated Oct. 3, 2022.
U.S. Appl. No. 15/548,348 Notice of Allowance dated Dec. 12, 2019.
U.S. Appl. No. 15/548,352 Office Action dated Apr. 7, 2022.
U.S. Appl. No. 15/548,352 Office Action dated Aug. 11, 2020.
U.S. Appl. No. 15/548,352 Office Action dated Jan. 31, 2020.
U.S. Appl. No. 15/548,352 Office Action dated May 9, 2019.
U.S. Appl. No. 15/548,352 Office Action dated Oct. 10, 2018.
U.S. Appl. No. 15/548,352 Office Action dated Sep. 21, 2021.
U.S. Appl. No. 16/097,035 Notice of Allowance dated Jul. 7, 2022.
U.S. Appl. No. 16/097,035 Notice of Allowance dated Mar. 24, 2022.
U.S. Appl. No. 16/097,035 Office Action dated May 10, 2021.
U.S. Appl. No. 16/097,035 Office Action dated Oct. 30, 2020.
U.S. Appl. No. 16/097,039 Notice of Allowance dated Jun. 14, 2021.
U.S. Appl. No. 16/097,039 Office Action dated Nov. 18, 2020.
U.S. Appl. No. 16/159,144 Office Action dated Mar. 26, 2020.
U.S. Appl. No. 16/180,635 Notice of Allowance dated Jul. 8, 2021.
U.S. Appl. No. 16/180,635 Notice of Allowance dated Jun. 29, 2021.
U.S. Appl. No. 16/180,635 Office Action dated Dec. 15, 2020.
U.S. Appl. No. 16/445,727 Notice of Allowance dated Feb. 2, 2023.
U.S. Appl. No. 16/445,727 Notice of Allowance dated Oct. 26, 2022.
U.S. Appl. No. 16/445,727 Office Action dated Apr. 15, 2022.
U.S. Appl. No. 16/445,727 Office Action dated Aug. 17, 2021.
U.S. Appl. No. 16/563,008 Office Action dated Jul. 25, 2022.
U.S. Appl. No. 16/563,008 Office Action dated Mar. 16, 2023.
U.S. Appl. No. 16/657,386 Notice of Allowance dated Mar. 10, 2023.
U.S. Appl. No. 16/657,386 Office Action dated Nov. 12, 2021.
U.S. Appl. No. 16/657,386 Office Action dated Sep. 16, 2022.
U.S. Appl. No. 16/802,174 Office Action dated Aug. 31, 2022.
U.S. Appl. No. 16/802,174 Office Action dated Feb. 16, 2022.
U.S. Appl. No. 16/802,190 Office Action dated Apr. 19, 2023.
U.S. Appl. No. 16/802,190 Office Action dated Oct. 5, 2022.
U.S. Appl. No. 16/802,212 Office Action dated Sep. 16, 2022.
U.S. Appl. No. 16/855,276 Notice of Allowance dated May 11, 2022.
U.S. Appl. No. 16/855,276 Office Action dated Apr. 5, 2021.
U.S. Appl. No. 16/855,276 Office Action dated Oct. 25, 2021.
U.S. Appl. No. 16/892,199 Notice of Allowance dated Jan. 23, 2023.
U.S. Appl. No. 16/892,199 Notice of Allowance dated Jan. 31, 2023.
U.S. Appl. No. 16/892,199 Office Action dated Jun. 27, 2022.
U.S. Appl. No. 17/062,075 Office Action dated Jun. 14, 2023.
U.S. Appl. No. 17/498,693 Office Action dated Apr. 3, 2023.
U.S. Appl. No. 17/817,482 Office Action dated Mar. 29, 2023.
U.S. Appl. No. 18/046,723 Notice of Allowance dated Apr. 12, 2023.
U.S. Appl. No. 16/802,190 Office Action dated Jan. 31, 2022.
Verfondern, Nuclear Energy for Hydrogen Production. Schriften des Forschungzentrum Julich 58 (2007): 4 pages.
What is Carbon Black, Orion Engineered Carbons, (Year: 2015).
ASTM International Designation: D6556-14. Standard Test Method for Carbon Black-Total and External Surface Area by Nitrogen Adsorption1, 2014. 5 Pages.
Co-pending U.S. Appl. No. 18/233,129, inventors Alexander; F. Hoermann et al., filed Aug. 11, 2023.
U.S. Appl. No. 15/241,771 Office Action dated Sep. 1, 2023.
U.S. Appl. No. 16/802,212 Office Action dated Jul. 17, 2023.
U.S. Appl. No. 17/669,183 Office Action dated Aug. 23, 2023.
U.S. Appl. No. 17/938,591 Office Action dated Sep. 25, 2023.
U.S. Appl. No. 18/046,723 Notice of Allowance dated Aug. 7, 2023.
PCT/US2023/024148 International Search Report and Written Opinion dated Sep. 27, 2023.
U.S. Appl. No. 16/802,174 Office Action dated Oct. 4, 2023.
U.S. Appl. No. 17/819,075 Office Action dated Oct. 5, 2023.
Co-pending U.S. Application No. 202318381881, inventors Hardman; Ned J. et al., filed on Oct. 19, 2023.
Co-pending U.S. Application No. 202318384704, inventors Johnson; Peter L. et al., filed on Oct. 27, 2023.
U.S. Appl. No. 15/241,771 Notice of Allowance dated Nov. 20, 2023.
U.S. Appl. No. 16/563,008 Notice of Allowance Dated Nov. 6, 2023.
U.S. Appl. No. 16/802,190 Office Action dated Nov. 17, 2023.
U.S. Appl. No. 18/137,918 Office Action dated Nov. 17, 2023.
U.S. Appl. No. 17/817,482 Office Action dated Dec. 7, 2023.
U.S. Appl. No. 15/229,608 Office Action dated Jan. 23, 2024.
U.S. Appl. No. 15/548,346 Notice of Allowance dated Jan. 18, 2024.
U.S. Appl. No. 17/669,183 Office Action dated Jan. 5, 2024.
Zhang, H. et al., Rotating gliding arc assisted methane decomposition in nitrogen for hydrogen production, Intern. J. Hydrogen Energy, 2014, 39, pp. 12620-12635 (Jul. 11, 2014).

REGENERATIVE COOLING METHOD AND APPARATUS

CROSS-REFERENCE TO RELATED APPLICATIONS

The present application is a continuation of U.S. patent application Ser. No. 17/329,532, filed May 25, 2021, which is a continuation of U.S. patent application Ser. No. 17/072, 416, filed Oct. 16, 2020, which is a continuation of U.S. patent application Ser. No. 16/807,550, filed Mar. 3, 2020, which is a continuation of U.S. patent application Ser. No. 15/548,348, filed Aug. 2, 2017, now U.S. Pat. No. 10,618, 026, issued Apr. 14, 2020, which is a U.S. National Stage of International Application No. PCT/US2016/015942, filed Feb. 1, 2016, which claims the benefit of and priority to provisional patent application Ser. No. 62/111,341 filed Feb. 3, 2015, each of which is herein incorporated by reference in its entirety.

TECHNICAL FIELD

The field of art to which this invention generally pertains is methods and apparatus for making use of electrical energy to effect chemical changes.

BACKGROUND

There are many processes that can be used and have been used over the years to produce carbon black. The energy sources used to produce such carbon blacks over the years have, in large part, been closely connected to the raw materials used to convert hydrocarbon containing materials into carbon black. Residual refinery oils and natural gas have long been a resource for the production of carbon black. Energy sources have evolved over time in chemical processes such as carbon black production from simple flame, to oil furnace, to plasma, to name a few. As in all manufacturing, there is a constant search for more efficient and effective ways to produce such products. Varying flow rates and other conditions of energy sources, varying flow rates and other conditions of raw materials, increasing speed of production, increasing yields, reducing manufacturing equipment wear characteristics, etc. have all been, and continue to be, part of this search over the years.

The systems described herein meet the challenges described above, and additionally attain more efficient and effective manufacturing process.

BRIEF SUMMARY

A method of cooling a liner in a plasma chamber is described including, contacting the liner with or passing through the liner, at least one recycle gas to be used to create the plasma in the plasma chamber, to cool the plasma chamber liner and pre-heat the recycle gas, and returning the pre-heated recycle gas to the plasma chamber to create the plasma.

Additional embodiments include: the method described above where the liner is graphite; the method described above where the recycle gas passes through at least one cooling channel present in the liner; the method described above where at least one of the cooling channels are covered with at least one removable liner/channel cover; the method described above where the cover is removed to remove any carbon deposits in the channels; the method described above where the carbon deposits are formed from the presence of hydrocarbons in the recycle gas; the method described above where at least one channel is formed in a spiral cooling channel pattern; the method described above where at least one channel is formed in a substantially straight cooling channel pattern; the method described above including more than one channel; the method described above including a plenum to aid in the production of an even distribution of cooling gas in the channels; the method described above including adding an oxidizing gas to the recycle gas to reduce or eliminate the presence of hydrocarbons in the recycle gas and/or reduce the formation of carbon deposits; the method described above where the oxidizing gas is steam and/or carbon dioxide; the method described above including passing an oxidizing gas through at least one of the channels to remove any carbon deposits in the channel; the method described above where the oxidizing gas is steam and/or carbon dioxide; the method described above where the carbon deposits are formed from the presence of hydrocarbons in the recycle gas; the method described above where the liner contains a plurality of perforations providing an ingress for the pre-heated recycle gas; the method described above where the perforations comprise one to six sets of co-planar perforations along the plasma chamber; the method described above where the plasma chamber is cylindrical and the perforations are along the curved sections of the plasma chamber cylinder; the method described above where the perforations allow aspirational cooling; the method described above where the plasma chamber contains a plasma torch annulus, and the gas is recycled to inside and/or outside the torch annulus; the method described above where the plasma is generated using an AC power source; the method described above where the plasma is generated using a DC power source; the method described above including injecting a hydrocarbon feedstock into the chamber such that over 30% of the energy input into the system measured in Joules is transferred to the hydrocarbon feedstock within the first 1 second of injection; the method described above where the hydrocarbon feedstock is natural gas; the method described above where the hydrocarbon feedstock is injected downstream of the plasma creation; and the method described above where the hydrocarbon feedstock is injected upstream of the plasma creation.

These, and additional embodiments, will be apparent from the following descriptions.

BRIEF DESCRIPTION OF THE DRAWINGS

The FIGS. 1, 2 and 3 show schematic representations of typical methods and apparatus described herein.

FIG. 7 shows a cross-sectional view of the plasma torch annulus.

DETAILED DESCRIPTION

Figure 1:
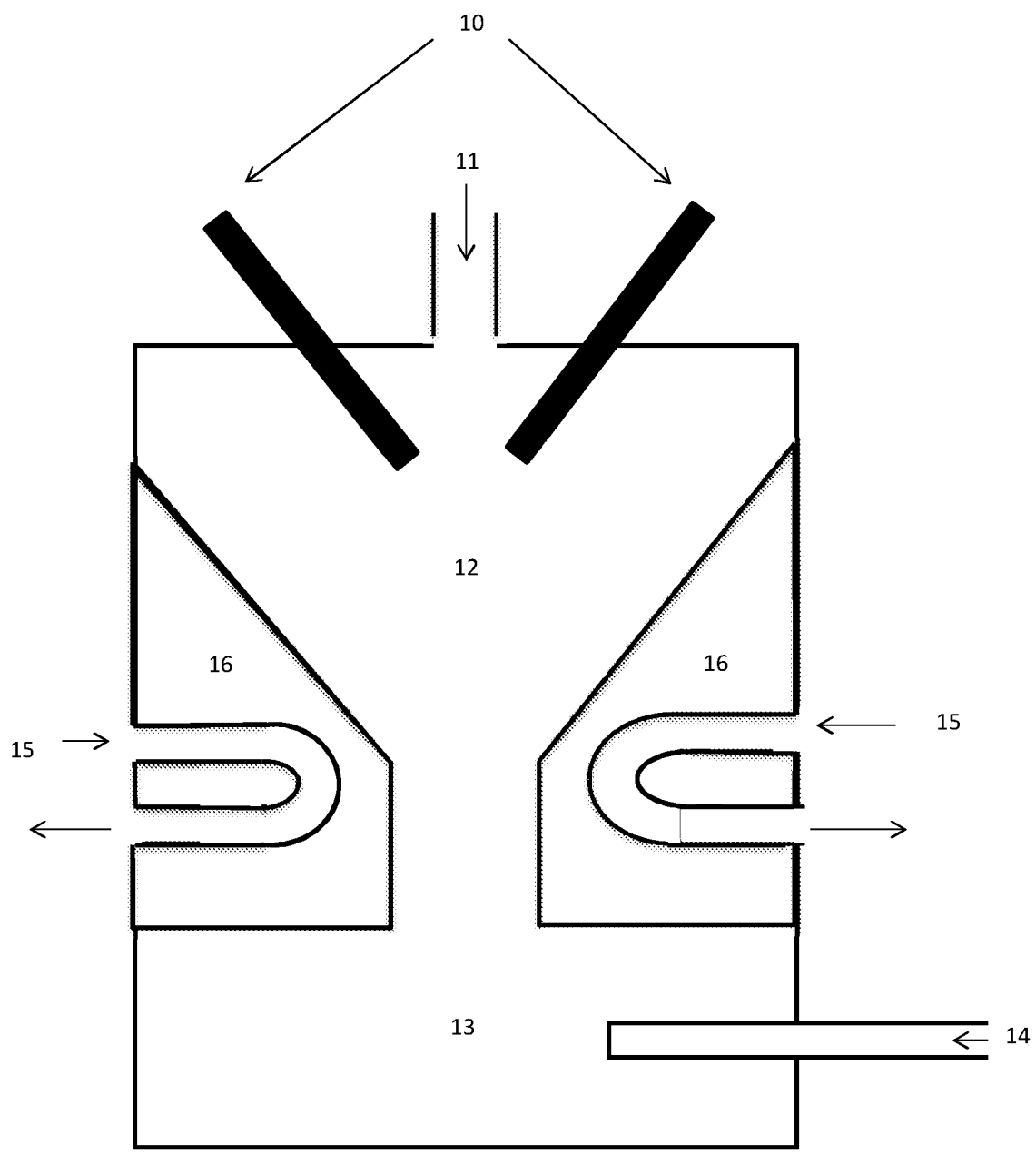

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Heat transfer or cooling mechanisms in the past have typically been external to the plasma chamber. For the furnace process, the burner does not need excessive cooling because of the inherent lower temperatures in the furnace process compared to a plasma process. An example of what could be considered as inefficient cooling/pre-heat of recycle gas can be found in published patent application US2014/190,179. The heat exchanger is located external to the plasma chamber resulting in inefficient cool down or lack of cool down in plasma chamber and an insufficiently heated recycle/plasma gas.

As described herein, the use of regenerative cooling enables higher plasma temperatures to be used in chemical processes without generating excessive plasma chamber liner temperatures. Previous uses of plasmas to make carbon black, for example, either limited the plasma temperatures which could be used, or used water cooling to limit the loss of, for example, graphite when used in the process, e.g. as a liner, to sublimation. As described herein, recycle plasma gas is used to cool the lining, e.g. graphite, with the gas ultimately to be used in the plasma chamber.

Energy absorbed in cooling the liner is returned to the process as preheated gas used in the plasma chamber, which can represent significant energy cost savings to the overall process. As mentioned previously, in published patent application US2014/190,179, the heat transfer mechanism is external to the plasma chamber. The system described herein provides for a simultaneously cooled plasma chamber liner and heated recycle/plasma gas by engineering and incorporating the cooling mechanism into the inner skin of the liner itself. The gas cools the liner by heat-transfer contact with the liner along various places in or on the liner. In one embodiment, the gas flows in channels cut into the liner. In another embodiment, the cut channels are covered with a removable cover or seal. This use of a removable liner cover or seal enables easy replacement of the liner should it get too hot, for example, and also allows easy access to the channels for cleaning or whatever other maintenance may be needed. Instead of using recycled plasma gas as described herein and lowering temperatures inside the chamber, an alternative would be to run the torch at higher power density (increased power with the same gas flow). With the recycled plasma gas system as described herein turned on the result would be chamber temperatures similar to the lower power density case without the recycled plasma gas system being used as described herein. The advantage would be the gas leaves the chamber at a higher temperature, giving it more usable enthalpy per unit of power consumed, leading to a more thermally efficient process.

Figure 3:
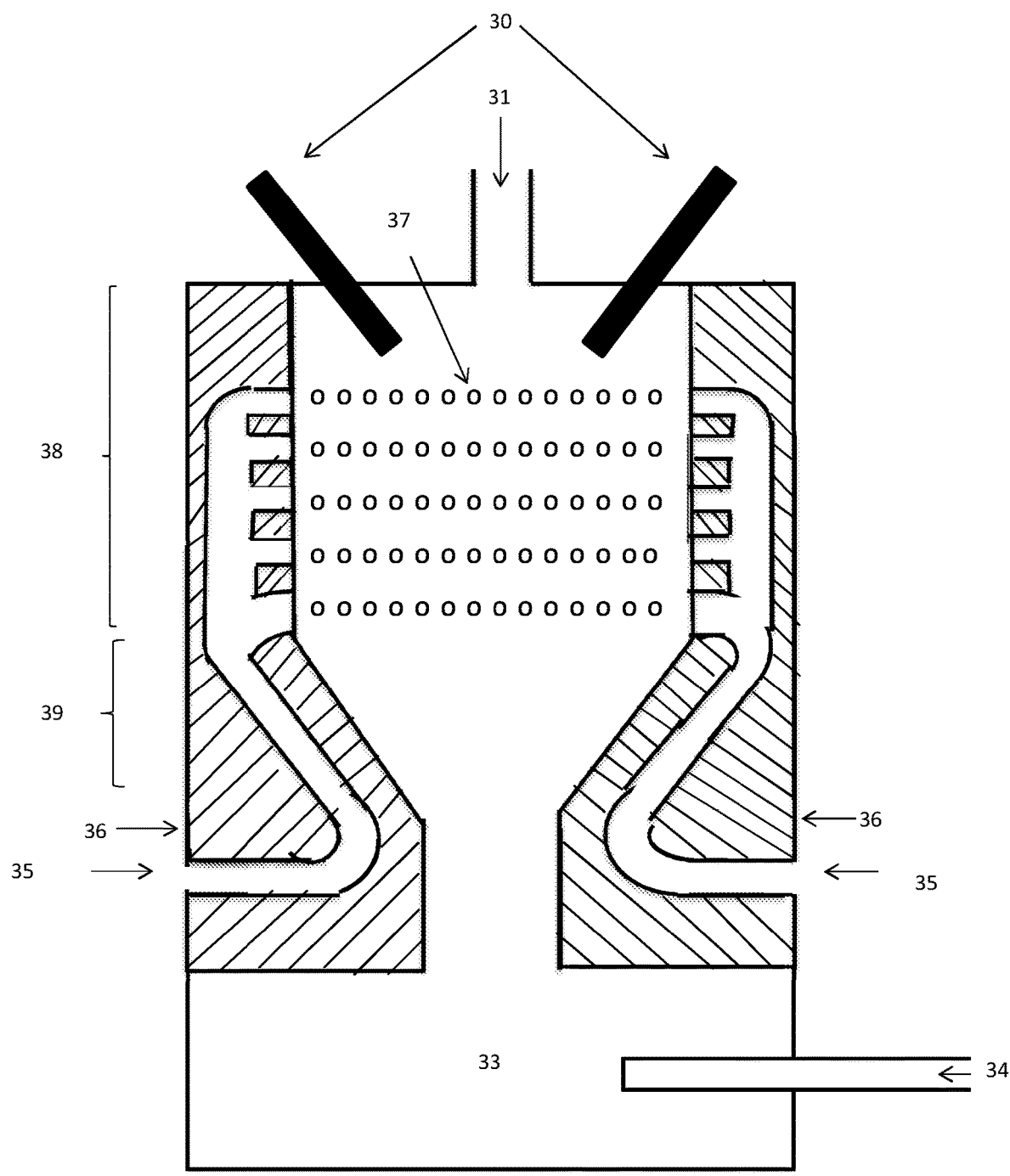
Figure 4:
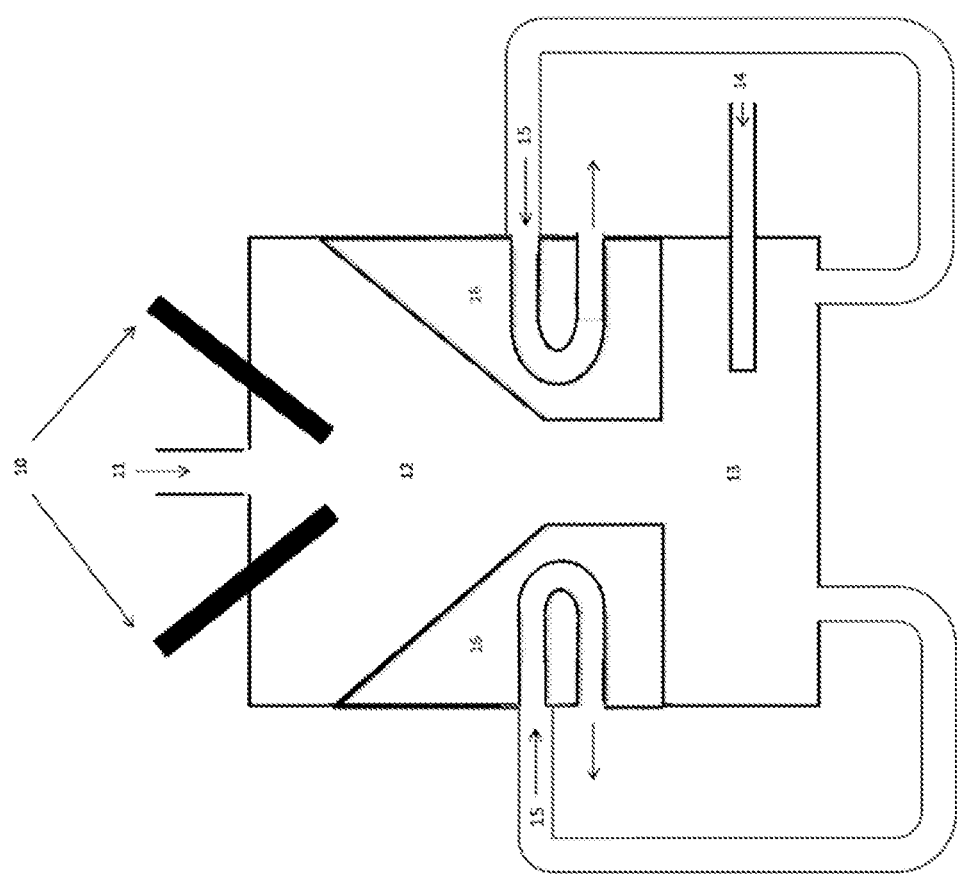
FIG. 4 shows an example of a second conduit fluidically connected to the plasma chamber and the liner, as described elsewhere herein.
Figure 5:
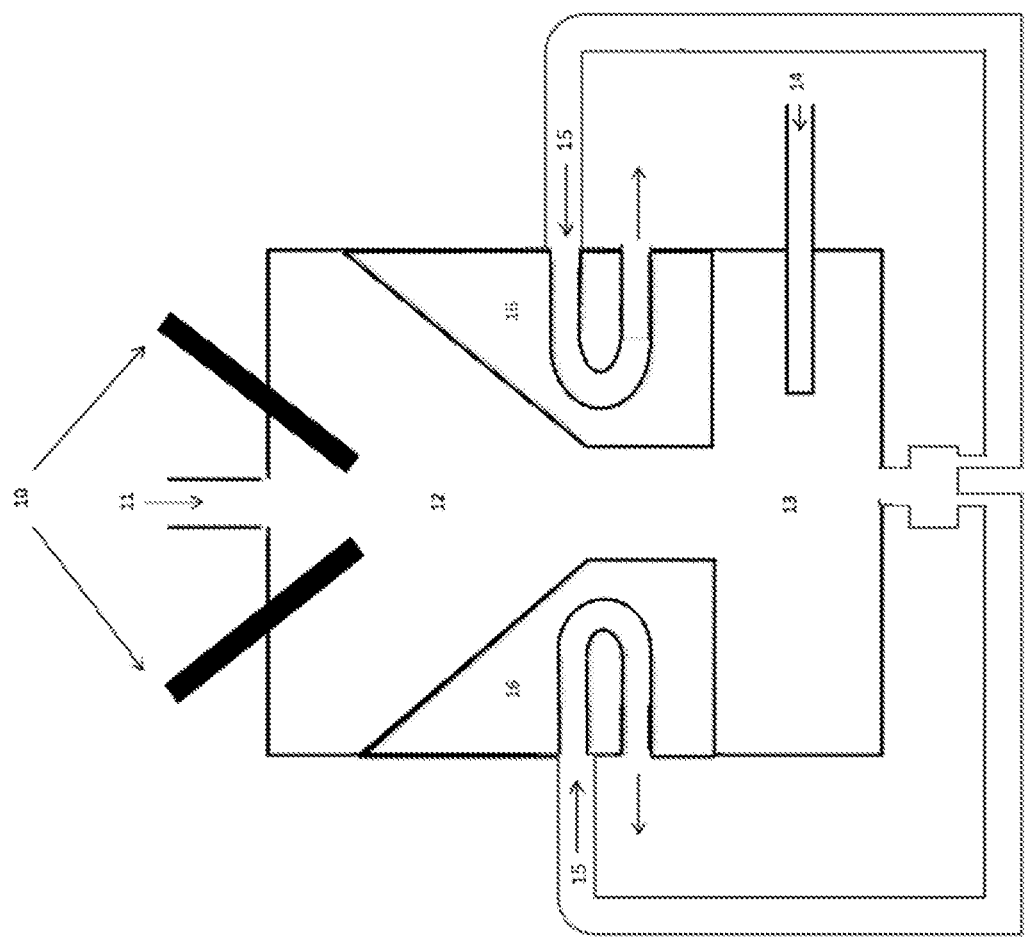
FIG. 5 shows an example of a second conduit comprising a plenum and fluidically connected to the plasma chamber and the liner, as described elsewhere herein.
Figure 6:
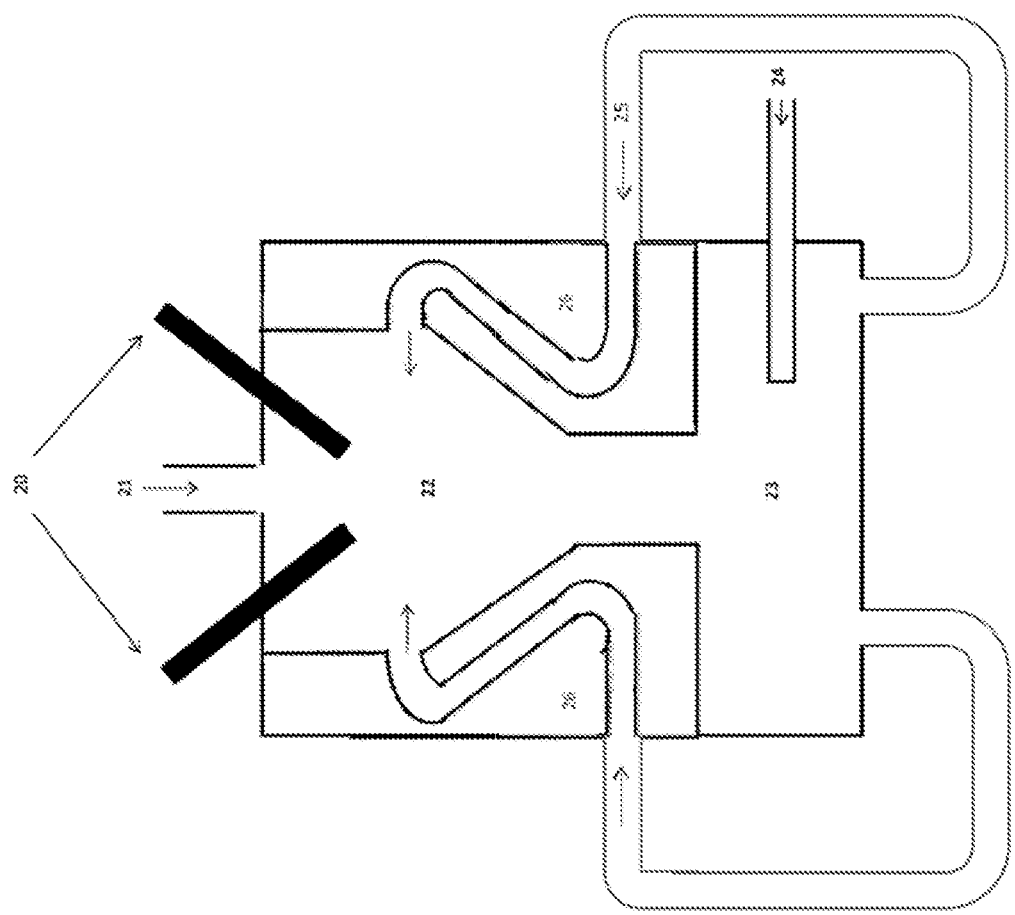
FIG. 6 shows another example of a second conduit fluidically connected to the plasma chamber and the liner, as described elsewhere herein.

While the perforations are shown in FIG. 3 as regularly spaced circular holes, it should be noted that any openings that provide for the injection of the pre-heated recycle gas (such as hydrogen) into the plasma chamber can be used, e.g., random holes or perforations, zig-zag patterns, slit shaped perforations, etc. Similarly, the plasma chamber can be of any shape, such as cylindrical, and the perforations therefore would be along the curved sections of the cylindrical plasma chamber.

Should the cooling recycle gas contain trace amounts of hydrocarbons or other contaminants which lead to the formation of carbon or other deposits in the cooling channels, such deposits can be easily removed so as not to limit or otherwise interfere with the cooling in the liner which would be otherwise achieved. Steam, carbon dioxide and/or other oxidizing gases can also be added to the recycle gas to help reduce the amount of hydrocarbons or other contaminants which may be present in the recycle cooling gas, again, so as to reduce or eliminate the deposition of carbon or other contaminants in the cooling channels. In addition, if any deposited carbon or other contaminants are deposited in the channels, feeding steam, carbon dioxide and/or other oxidizing gas into the channels can also assist in eliminating any such deposits from the channels.

It is advantageous to obtain as uniform a cooling as possible in the liner, e.g., to avoid formation of "hot spots"

in or on the liner. Accordingly, it is beneficial to subject the liner to as uniform and continuous a contact with cooling gas as possible, either externally and/or internally One embodiment for achieving a more even distribution of cooling gas is the use of one or more spiral cooling channels in the liners, although one or more straight, curved, or otherwise non-spiral channels can be used as well, either in combination or instead of spiral channels. If multiple channels are used, the use of a plenum to help provide an even distribution of the cooling gases within the channels is also beneficial.

The size and spacing of the channels will of course depend on the temperatures being generated in the plasma and/or reaction chambers, and the amount of cooling desired. Typical temperatures in the plasma chamber range from about 2500° C. to about 6000° C. and about 1200° C. to about 3000° C. in the reaction chamber. The channels are typically machined in as grooves, e.g., using conventional graphite cutting techniques and equipment, and are typically square or rectangular in cross section, and can be any size to accommodate the amount of cooling desired, e.g.,15 to 30 millimeters (mm) across and 50 to 100 mm deep.

Typically, between about 2 and about 20 MegaWatts of power are employed to create the plasma. The energy as measured in Joules will first be employed to create the plasma, and then be subsequently absorbed into the walls of the reactor, transferred to the plasma gas that did not go through the annulus or the plasma zone, and either immediately absorbed by the hydrocarbon or transferred to the injected hydrocarbon from the walls or from the plasma gas. The energy is absorbed by the hydrocarbon in the first one second after injection in the amount of at least 20%, 30%, or 40% or greater as measured in Joules. This energy can be absorbed from the electrodes, the plasma gas, the wall of the reactors, etc.

A perforated liner to enable aspirational cooling of the liner can also be used. Not only could this allow cooling gases to pass through the liner more uniformly, but it could also accelerate passage of gases in the hottest areas to dissipate heat more quickly, again to assist in attaining more uniform cooling. The pores present in the liner could either be drilled into the liner, or their formation incorporated into the process of manufacturing of the (porous) graphite used to form the liner.

Depending on the shape of the plasma assembly, the cooling gases can also be used in the torch annulus and/or outside of the torch annulus. Gas heated in the channels can be added to the plasma chamber or to the plasma gas which then flows through the annulus between the electrodes, i.e., since not all torches have an annulus, the recycle gas can be added to the plasma or mixed into the plasma after the arc. The torch annulus is defined as the space between two nested, concentric hollow cylinders that are used as the positive and negative electrodes of the torch.

As described herein, the cooling gases are used to cool the liner with the gas used in the plasma chamber, and in doing so preheat the gas used in the chamber, thereby reducing the amount of energy required to heat the plasma chamber gases to achieve a given temperature.

Referring to the Figures (including FIGS. 1-7), which are schematic representations of systems described herein, conventional plasma gas (11, 21 and 31) such as oxygen, nitrogen, argon, helium, air. hydrogen, etc. (used alone or in mixtures of two or more) is injected into a plasma forming zone (12 and 22, and below the perforations 37 in FIG. 3) containing conventional plasma forming electrodes (10, 20 and 30) (which are typically made of copper, tungsten, graphite, molybdenum, silver etc.). The thus-formed plasma then enters into the reaction zone (13, 23 and 33) where it reacts/interacts with a carbon containing feedstock (14, 24 and 34) to generate a carbon black product. The liners (16, 26 and 36) can be any conventionally used material which can withstand the plasma forming temperatures, with graphite being preferred. Materials that can only withstand plasma forming temperatures with cooling may also be used. As shown, the recycle cooling gas flows through the cooling channels (15, 25 and 35), cooling the liner (16, 26 and 36) and heating the gas. The heated gas then flows into the plasma arc (as all or part of stream 11) as demonstrated in FIG. 1 and/or mixes into the plasma gas (formed from stream 21) with the mixing occurring in the plasma zone (22) as demonstrated in FIG. 2, or through the perforations (37) shown in FIG. 3. The mixture then flows into the reaction zone (13, 23 and 33) to contact the feedstock gas (14, 24 and 34).

Adding the heated cooling gas into the plasma gas stream (11) could potentially cause problems for the arc formed between the electrodes (10), so in some cases it may not be desirable. In these instances, all of or a portion of the cooling gas can instead get added to the plasma zone (22 and through perforations 37), preferably along the inside of the liner so that the gas provides additional protection for the liner from the hot plasma gas. The mixture then flows into the reaction zone (23 and 33) to contact the feedstock gas (24 and 34). It should also be noted, that that the direction of flow shown for the cooling gases (15 in FIG. 1) can also be in a direction reverse of that shown. The desired direction of flow will be dependent on the radiation flux on the liner, which is in turn dependent on the actual geometry of the liner. Thus flow can be counter current to plasma gas flow, co-current and/or cross-flow. The pre-heated gas can be injected through a co-planar set of perforations or multiple sets of co-planar perforations. The upper section (38) of the perforated section of FIG. 3 can be cylindrical in shape, with the lower section (39) being a converging cone. Although not shown in FIG. 3, it should also he noted that the perforations can extend above the space in the plasma chamber occupied by the electrodes as well.

The Figures demonstrate liners with curved channels contained therein. However, it should be understood that the cooling of the liners can take place by simply passing the cooling recycle plasma gas along one or more surfaces of the liners (depending on liner design), or through the liner by virtue of the presence of one or more straight, curved, spiral or other shaped channels. Since there are numerous advantages associated with uniformity of cooling by and/or within the liner, if multiple channels are present in the liner, a plenum (shown in FIG. 5) can be used to assist in leveling the flow into the respective channels to help produce more even heat distribution within the liner. The liners can also contain pores, or be porous, such that the cooling can take place as aspirational cooling. The size and shape of the liners, the pores and the cooling surfaces or channels will depend on the size and shapes of the plasma forming zone and reaction zone, the temperatures desired in each zone, the amount and rate of cooling desired, the specific plasma gas being used, etc. For example, the generation and use of plasma at temperatures in excess of 1000° C. are not uncommon, which is one reason temperature control can be important to the process.

Figure 2:
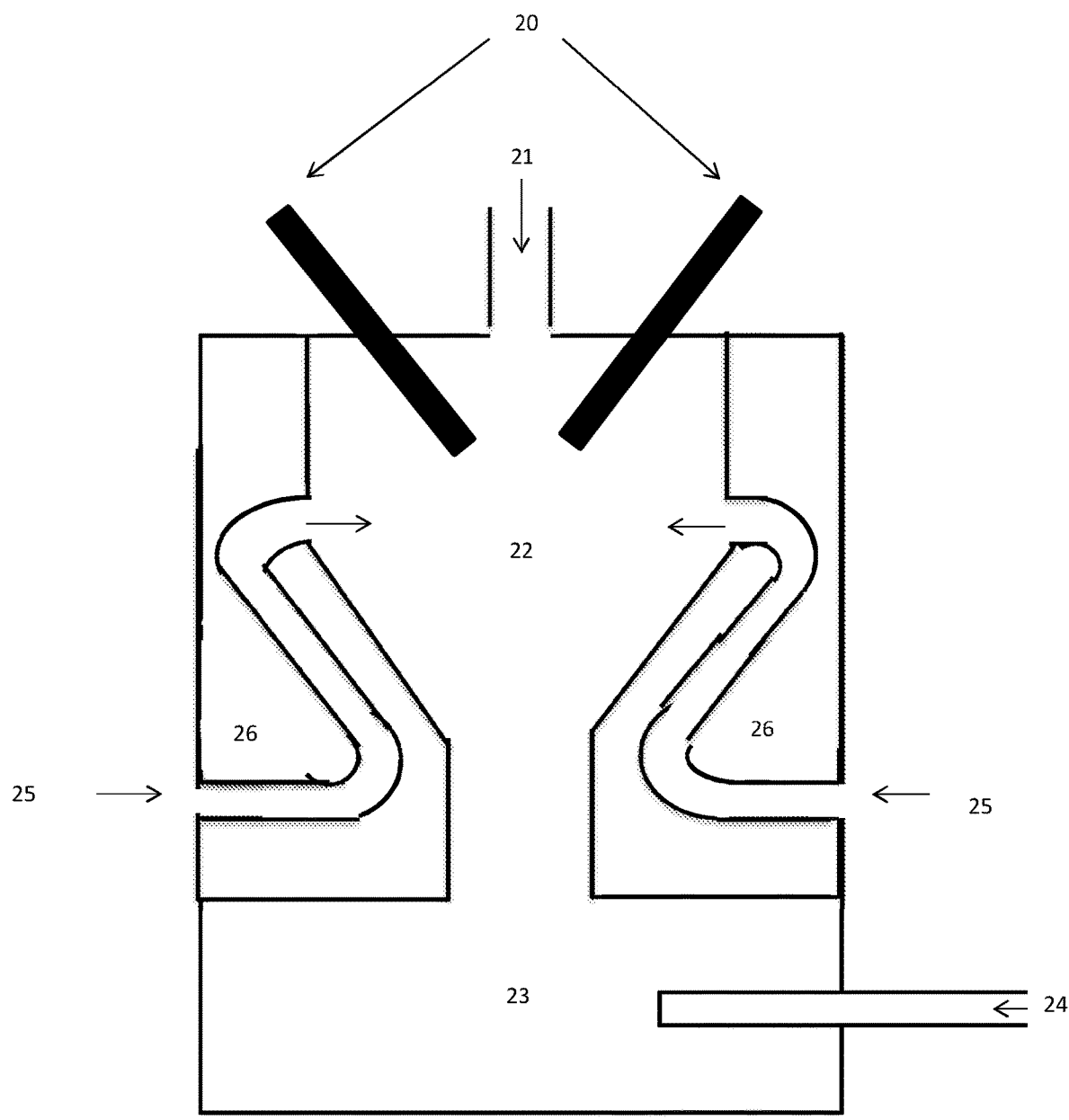

The Figures show a narrowing plasma chamber that then expands to a larger area downstream of plasma generation. An alternative configuration can entail a plasma chamber that does not narrow, but can or cannot expand downstream of plasma generation. The regenerative cooling would still take place in the general vicinity of the plasma generation (plasma chamber). Additionally, the hydrocarbon injection can occur either upstream or downstream of the plasma generation and can be centrally injected rather than the side injection that is depicted in FIGS. 1, 2, and 3.

Acceptable hydrocarbon feedstock includes any chemical with formula $C_nH_x$ or $C_nH_xO_y$, where n is an integer, and x is between 1 and 2n+2, and y is between 0 and n. For example simple hydrocarbons such as: methane, ethane, propane, butane, etc. can be used, as well as aromatic feedstock such as benzene, toluene, methyl naphthalene, pyrolysis fuel oil, coal tar, coal, heavy oil, oil, bio-oil, bio-diesel, other biologically derived hydrocarbons, or the like. Also, unsaturated hydrodcarbon feedstocks can also be used, such as: ethylene, acetylene, butadiene, styrene and the like. Oxygenated hydrocarbons such as; ethanol, methanol, propanol, phenol, ether, and similar are also acceptable feedstocks. These examples are provided as non-limiting examples of acceptable hydrocarbon feedstocks which can further be combined and/or mixed with other acceptable components for manufacture. Hydrocarbon feedstock referred to herein, means that the majority of the feedstock is hydrocarbon in nature. A preferred hydrocarbon feedstock for this process is natural gas.

The recycle plasma gas is flowed through the channels in the liner which in addition to reducing the temperatures in the plasma and/or reaction chambers, raises the temperature of the cooling gas as well. After being heated, the recycle plasma gas is then used as is or mixed with the plasma gas being injected into the plasma zone. As can be appreciated, this pre-heating of the plasma gas can provide significant energy costs savings to the process.

In one embodiment, the channels are open and accessible, but covered or sealed during use. This accessibility facilitates such things as repair and replacement of the liners, and/or cleaning of the channels. For example, the plasma gas can contain hydrocarbons or other contaminants. At the high temperatures experienced in typical plasma processes, carbon or other deposits can end up on the liner or in the channels or pores. A removable cover or seal can facilitate the cleaning of such deposits. The covers are typically made of the same material as the liners, but can also be made of a porous material (e.g., carbon fibers, graphite foam, etc).

Even without the covers or seals described above, another way to reduce or eliminate such deposits from the channels, is to add an oxidizing gas to the plasma forming gas prior to entry into the cooling channel. Similarly, an oxidizing gas can be simply run through the channels for the same purpose. Exemplary oxidizing gases could be steam and/or carbon dioxide, for example.

Figure 7:
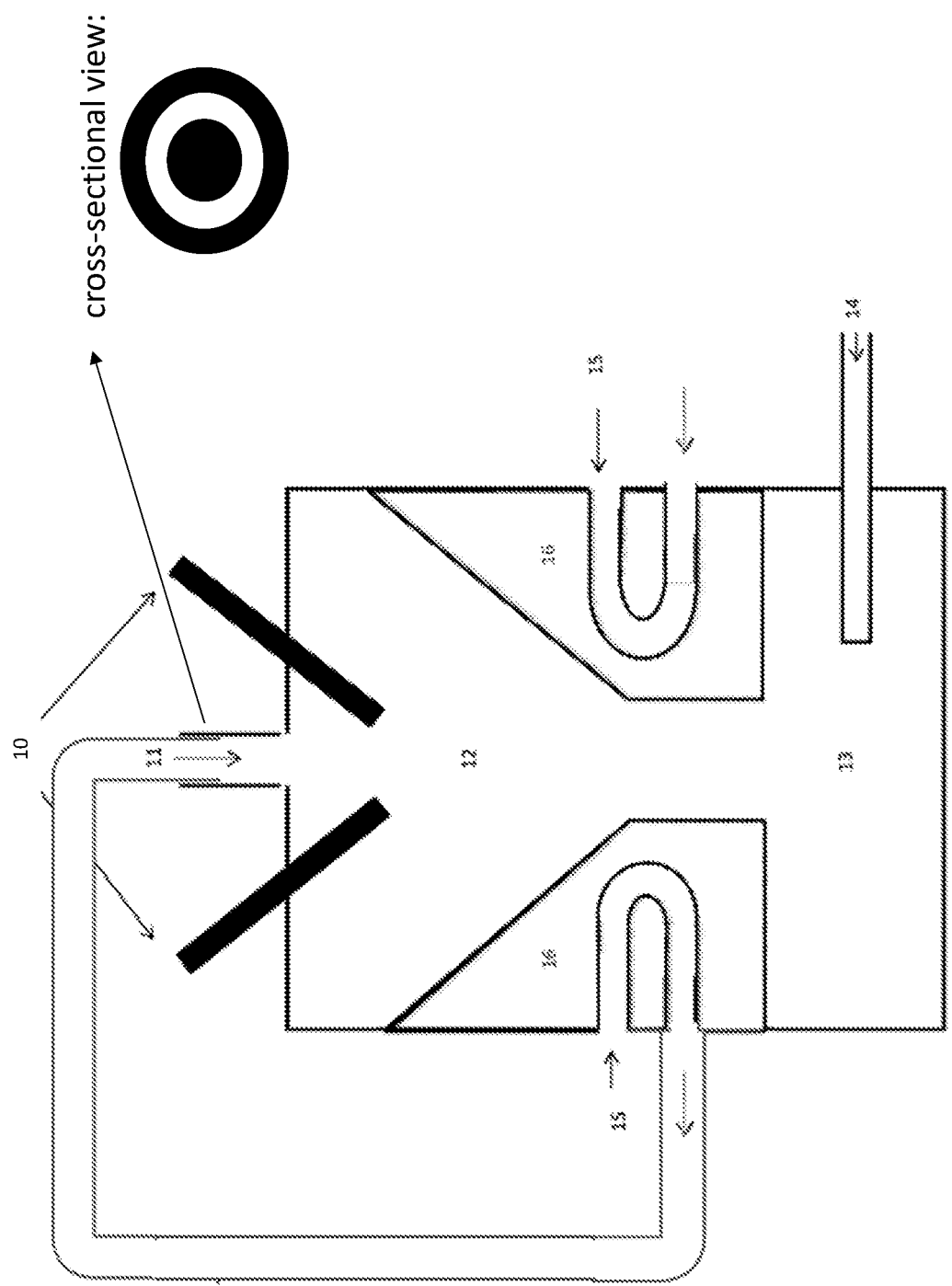
FIG. 7 shows an example of a third conduit configured to receive gas and provide the gas to the plasma chamber. Additionally.

In some cases, the plasma forming zone may contain a conventional plasma torch annulus, as shown schematically in FIG. 1, e.g., having a cathode, anode, plasma or carrier working gas (11) and plasma jet region (12). In such cases, the cooling recycle plasma gas may be flowed inside or outside the torch annulus, i.e., the plasma recycle gas can be added to the carrier working gas stream (11), or added to the plasma jet region (12) (as shown in FIG. 7).

In another set of cases, AC or DC power can be used to form the plasma. Examples of an AC plasma system can be found in U.S. Pat. No. 7,452,514, for example. The AC system can utilize a plurality of electrodes that has the advantage of more efficient energy consumption as well as reduced heat load at the electrode surface. Examples of a suitable DC plasma system can be found, for example, in U.S. Pat. No. 7,462,343, and the references therein.

EXAMPLE 1

Hydrogen gas is run through a conventional plasma torch electrode assembly in a plasma forming zone. Graphite liners with cooling channels line the plasma forming zone. As can be seen in the Table below, the average temperature of the plasma chamber wall is 2640 K and the maximum temperature is 3210 K. Through the diversion of 10%, 20%, and 30% of the total recycle gas, which is greater than 90% $H_2$, the following examples B, C, and D show a significant decrease in plasma wall temperature. For diversion of 30% of the total recycle gas the average temperature at the plasma wall is reduced from 2640 K to 2450 K and the maximum temperature is reduced from 3210 K to 3040 K. Each of these examples is with a heat input through the plasma torch of 750 KW (kilo watts) and a plasma gas flow rate of 340 $Nm^3$/hr (normal cubic meter/hour) of hydrogen.

TABLE

| Example | Hydrogen Gas at % of total | Average Temperature (K) | Maximum Temperature (K) |
| --- | --- | --- | --- |
| A | 0 | 2640 | 3210 |
| B | 10 | 2490 | 3140 |
| C | 20 | 2470 | 3090 |
| D | 30 | 2450 | 3040 |

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus comprising:
   a plasma chamber, wherein the plasma chamber comprises (i) a plasma torch; and (ii) a liner, wherein the liner comprises a first conduit configured to transport gas from the liner and through the plasma torch; and
   a second conduit fluidically connected to the plasma chamber and the first conduit, wherein the second conduit is configured to transport the gas from the plasma chamber to the first conduit of the liner.

2. The apparatus of claim 1, wherein the first conduit comprises an inlet and an outlet, wherein (1) the inlet is fluidically connected to the second conduit; (2) the outlet is fluidically connected to the plasma chamber; (3) the inlet is configured to receive the gas from the second conduit; and (4) the outlet is configured to provide the gas to the plasma chamber.

3. The apparatus of claim 1, wherein the first conduit comprises an inlet and an outlet, wherein (1) the inlet is fluidically connected to the second conduit; (2) the outlet is fluidically connected to the plasma chamber; (3) the inlet is configured to receive the gas from the second conduit; and (4) the outlet is configured to direct the gas away from the apparatus.

4. The apparatus of claim 1, wherein the liner comprises graphite.

5. The apparatus of claim 1, wherein at least a portion of the liner is removable.

6. The apparatus of claim 1, wherein the first conduit comprises a channel having a spiral pattern.

7. The apparatus of claim 1, wherein the first conduit comprises a channel having a substantially straight pattern.

8. The apparatus of claim 1, wherein the liner comprises a plurality of conduits.

9. The apparatus of claim 1, further comprising a plenum operably connected to the first conduit.

10. The apparatus of claim 1, wherein the liner comprises a plurality of perforations fluidically connected to the first conduit of the liner and the plasma chamber, wherein the plurality of perforations is configured to transport the gas from the first conduit to the plasma chamber.

11. The apparatus of claim 10, wherein perforations of the plurality of perforations are arranged in a co-planar pattern with respect to the plasma chamber.

12. The apparatus of claim 1, wherein the plasma chamber is cylindrical.

13. The apparatus of claim 1, wherein the plasma torch comprises an annulus, and wherein the first conduit is fluidically connected to the annulus.

14. The apparatus of claim 1, wherein the plasma torch comprises a plurality of electrodes arranged as concentric hollow cylinders.

15. The apparatus of claim 1, further comprising a third conduit, wherein the third conduit is configured to receive gas and provide the gas to the plasma chamber.

16. The apparatus of claim 15, wherein the third conduit is fluidically connected to the plasma chamber upstream from at least a portion of the plasma torch of the plasma chamber.

17. The apparatus of claim 15, wherein the third conduit is fluidically connected to the plasma chamber downstream from the plasma torch of the plasma chamber.

18. The apparatus of claim 1, wherein the liner comprises a porous material.

19. The apparatus of claim 1, wherein at least a portion of the liner reduces a width of the plasma chamber along an axis of the plasma chamber.

20. The apparatus of claim 1, further comprising the gas.

* * * * *